*US007502869B2*

United States Patent
Boucher et al.

(10) Patent No.: US 7,502,869 B2
(45) Date of Patent: Mar. 10, 2009

(54) INTELLIGENT NETWORK INTERFACE SYSTEM AND METHOD FOR ACCELERATED PROTOCOL PROCESSING

(75) Inventors: Laurence B. Boucher, Saratoga, CA (US); Clive M. Philbrick, San Jose, CA (US); Daryl D. Starr, Milpitas, CA (US); Stephen E. J. Blightman, San Jose, CA (US); Peter K. Craft, San Francisco, CA (US); David A. Higgen, Saratoga, CA (US)

(73) Assignee: Alacritech, Inc., San Jose, CA (US)

( * ) Notice: Subject to any disclaimer, the term of this patent is extended or adjusted under 35 U.S.C. 154(b) by 758 days.

(21) Appl. No.: 10/724,588

(22) Filed: Nov. 28, 2003

(65) Prior Publication Data

US 2004/0111535 A1 Jun. 10, 2004

Related U.S. Application Data

(63) Continuation of application No. 09/802,550, filed on Mar. 9, 2001, now Pat. No. 6,658,480, which is a continuation-in-part of application No. 09/067,544, filed on Apr. 27, 1998, now Pat. No. 6,226,680, said application No. 09/802,550 is a continuation-in-part of application No. 09/141,713, filed on Aug. 28, 1998, now Pat. No. 6,389,479, said application No. 09/802,550 is a continuation-in-part of application No. 10/005,536, filed on Nov. 7, 2001, and a continuation-in-part of application No. 09/802,551, filed on Mar. 9, 2001, and a continuation-in-part of application No. 09/802,426, filed on Mar. 9, 2001, and a continuation-in-part of application No. 09/801,488, filed on Mar. 7, 2001, now Pat. No. 6,687,758, and a continuation-in-part of application No. 09/789,366, filed on Feb. 20, 2001, now Pat. No. 6,757,746, and a continuation-in-part of application No. 09/748,936, filed on Dec. 26, 2000, now Pat. No. 6,334,153, and a continuation-in-part of application No. 09/692,561, filed on Oct. 18, 2000, and a continuation-in-part of application No. 09/675,700, filed on Sep. 29, 2000, and a continuation-in-part of application No. 09/675,484, filed on Sep. 29, 2000, now Pat. No. 6,807,581, and a continuation-in-part of application No. 09/464,283, filed on Dec. 15, 1999, now Pat. No. 6,427,173, and a continuation-in-part of application No. 09/439,603, filed on Nov. 12, 1999, now Pat. No. 6,247,060, and a continuation-in-part of application No. 09/416,925, filed on Oct. 13, 1999, now Pat. No. 6,470,415, and a continuation-in-part of application No. 09/384,792, filed on Aug. 27, 1999, now Pat. No. 6,434,620.

(60) Provisional application No. 60/098,296, filed on Aug. 27, 1998, provisional application No. 60/061,809, filed on Oct. 14, 1997.

(51) Int. Cl.
*G06F 15/16* (2006.01)
*G06F 3/00* (2006.01)
*G06F 13/00* (2006.01)
*H04Q 7/00* (2006.01)

(52) U.S. Cl. .................... 709/250; 709/230; 710/29; 710/33; 370/328

(58) Field of Classification Search ......... 709/249–250, 709/203, 228; 370/401–404
See application file for complete search history.

(56) References Cited

U.S. PATENT DOCUMENTS

| | | | |
|---|---|---|---|
| 4,366,538 A | 12/1982 | Johnson et al. | ............. 364/200 |
| 4,485,455 A | 11/1984 | Boone et al. | ................. 364/900 |
| 4,485,460 A | 11/1984 | Stambaugh | ................. 365/203 |
| 4,589,063 A | 5/1986 | Shah et al. | ...................... 710/8 |
| 4,700,185 A | 10/1987 | Balph et al. | .............. 340/825.5 |
| 4,991,133 A | 2/1991 | Davis et al. | ................. 364/900 |
| 5,056,058 A | 10/1991 | Hirata et al. | ................. 709/230 |
| 5,058,110 A | 10/1991 | Beach et al. | ................ 370/85.6 |
| 5,097,442 A | 3/1992 | Ward et al. | ...................... 365/78 |
| 5,163,131 A | 11/1992 | Row et al. | |
| 5,212,778 A | 5/1993 | Dally et al. | |
| 5,280,477 A | 1/1994 | Trapp | ........................ 370/85.1 |
| 5,289,580 A | 2/1994 | Latif et al. | |

| Patent | Date | Inventor | Class |
|---|---|---|---|
| 5,303,344 A | 4/1994 | Yokoyama et al. | |
| 5,321,819 A * | 6/1994 | Szczepanek | 709/228 |
| 5,412,782 A | 5/1995 | Hausman et al. | |
| 5,418,912 A | 5/1995 | Christenson | 395/200 |
| 5,448,566 A | 9/1995 | Richter et al. | 370/94.1 |
| 5,485,579 A | 1/1996 | Hitz et al. | |
| 5,506,966 A | 4/1996 | Ban | |
| 5,511,169 A | 4/1996 | Suda | |
| 5,517,668 A | 5/1996 | Szwerinski et al. | 395/800 |
| 5,524,250 A | 6/1996 | Chesson et al. | |
| 5,535,375 A | 7/1996 | Eshel et al. | 391/500 |
| 5,548,730 A | 8/1996 | Young et al. | |
| 5,566,170 A | 10/1996 | Bakke et al. | 370/60 |
| 5,574,919 A | 11/1996 | Netravali et al. | 395/561 |
| 5,588,121 A | 12/1996 | Reddin et al. | |
| 5,590,328 A | 12/1996 | Seno et al. | |
| 5,592,622 A | 1/1997 | Isfeld et al. | 395/200.02 |
| 5,598,410 A | 1/1997 | Stone | 370/469 |
| 5,619,650 A | 4/1997 | Bach et al. | |
| 5,629,933 A | 5/1997 | Delp et al. | 370/411 |
| 5,633,780 A | 5/1997 | Cronin et al. | 361/220 |
| 5,634,099 A | 5/1997 | Andrews et al. | |
| 5,634,127 A | 5/1997 | Cloud et al. | |
| 5,642,482 A | 6/1997 | Pardillos | |
| 5,664,114 A | 9/1997 | Krech, Jr. et al. | |
| 5,671,355 A | 9/1997 | Collins | |
| 5,678,060 A | 10/1997 | Yokoyama et al. | 709/212 |
| 5,682,534 A | 10/1997 | Kapoor et al. | 395/684 |
| 5,692,130 A | 11/1997 | Shobu et al. | |
| 5,699,317 A | 12/1997 | Sartore et al. | |
| 5,699,350 A | 12/1997 | Kraslavsky | 370/254 |
| 5,701,434 A | 12/1997 | Nakagawa | |
| 5,701,516 A | 12/1997 | Cheng et al. | |
| 5,727,142 A | 3/1998 | Chen | |
| 5,742,765 A | 4/1998 | Wong et al. | 395/200 |
| 5,749,095 A | 5/1998 | Hagersten | 711/141 |
| 5,751,715 A | 5/1998 | Chan et al. | 370/455 |
| 5,752,078 A | 5/1998 | Delp et al. | |
| 5,758,084 A | 5/1998 | Silverstein et al. | |
| 5,758,089 A | 5/1998 | Gentry et al. | |
| 5,758,186 A | 5/1998 | Hamilton et al. | |
| 5,758,194 A | 5/1998 | Kuzma | |
| 5,768,618 A | 6/1998 | Erickson et al. | 395/829 |
| 5,771,349 A | 6/1998 | Picazo, Jr. et al. | |
| 5,774,660 A | 6/1998 | Brendel et al. | 395/200.31 |
| 5,778,013 A | 7/1998 | Jedwab | 714/807 |
| 5,778,419 A | 7/1998 | Hansen et al. | 711/112 |
| 5,790,804 A * | 8/1998 | Osborne | 709/245 |
| 5,794,061 A | 8/1998 | Hansen et al. | |
| 5,802,258 A | 9/1998 | Chen | |
| 5,802,278 A * | 9/1998 | Isfeld et al. | 709/249 |
| 5,802,580 A | 9/1998 | McAlpice | 711/149 |
| 5,809,328 A | 9/1998 | Nogales et al. | |
| 5,809,527 A | 9/1998 | Cooper et al. | 711/133 |
| 5,812,775 A | 9/1998 | Van Seeters et al. | |
| 5,815,646 A | 9/1998 | Purcell et al. | |
| 5,828,835 A | 10/1998 | Isfeld et al. | 395/200.3 |
| 5,848,293 A | 12/1998 | Gentry et al. | 395/825 |
| 5,872,919 A | 2/1999 | Wakeland et al. | 395/200 |
| 5,878,225 A | 3/1999 | Bilansky et al. | |
| 5,892,903 A | 4/1999 | Klaus | 395/187.01 |
| 5,898,713 A | 4/1999 | Melzer et al. | 371/53 |
| 5,913,028 A * | 6/1999 | Wang et al. | 709/203 |
| 5,920,566 A | 7/1999 | Hendel et al. | 370/401 |
| 5,930,830 A | 7/1999 | Mendelson et al. | 711/171 |
| 5,931,918 A | 8/1999 | Row et al. | 709/300 |
| 5,935,205 A | 8/1999 | Murayama et al. | 709/216 |
| 5,937,169 A * | 8/1999 | Connery et al. | 709/250 |
| 5,941,969 A * | 8/1999 | Ram et al. | 710/315 |
| 5,941,972 A | 8/1999 | Hoese et al. | 710/129 |
| 5,950,203 A | 9/1999 | Stakuis et al. | 707/10 |
| 5,987,022 A | 11/1999 | Geiger et al. | 370/349 |
| 5,991,299 A | 11/1999 | Radogna et al. | 370/392 |
| 5,996,013 A | 11/1999 | Delp et al. | 709/226 |
| 5,996,024 A | 11/1999 | Blumenau | 709/301 |
| 6,005,849 A | 12/1999 | Roach et al. | 370/276 |
| 6,009,478 A | 12/1999 | Panner et al. | 710/5 |
| 6,016,513 A | 1/2000 | Lowe | 709/250 |
| 6,021,446 A | 2/2000 | Gentry et al. | 709/303 |
| 6,021,507 A | 2/2000 | Chen | 714/2 |
| 6,026,452 A | 2/2000 | Pitts | 710/56 |
| 6,034,963 A | 3/2000 | Minami et al. | 370/401 |
| 6,038,562 A | 3/2000 | Anjur et al. | 707/10 |
| 6,041,058 A | 3/2000 | Flanders et al. | 370/401 |
| 6,041,381 A | 3/2000 | Hoese | 710/129 |
| 6,044,438 A | 3/2000 | Olnowich | 711/130 |
| 6,047,323 A | 4/2000 | Krause | 709/227 |
| 6,047,356 A | 4/2000 | Anderson et al. | 711/129 |
| 6,049,528 A | 4/2000 | Hendel et al. | 370/235 |
| 6,057,863 A | 5/2000 | Olarig | 345/520 |
| 6,061,368 A | 5/2000 | Hitzelberger | 370/537 |
| 6,065,096 A | 5/2000 | Day et al. | 711/114 |
| 6,067,569 A | 5/2000 | Khaki et al. | 709/224 |
| 6,070,200 A | 5/2000 | Gates et al. | 710/20 |
| 6,078,733 A | 6/2000 | Osborne | 395/200.8 |
| 6,097,734 A | 8/2000 | Gotesman et al. | 370/474 |
| 6,101,555 A | 8/2000 | Goshey et al. | 709/321 |
| 6,111,673 A | 8/2000 | Chang et al. | 359/123 |
| 6,115,615 A | 9/2000 | Ota et al. | 455/553 |
| 6,122,670 A | 9/2000 | Bennett et al. | 709/236 |
| 6,141,701 A | 10/2000 | Whitney | 710/5 |
| 6,141,705 A | 10/2000 | Anand et al. | 710/15 |
| 6,145,017 A | 11/2000 | Ghaffari | 710/5 |
| 6,157,955 A | 12/2000 | Narad et al. | 709/228 |
| 6,172,980 B1 | 1/2001 | Flanders et al. | 370/401 |
| 6,173,333 B1 * | 1/2001 | Jolitz et al. | 709/240 |
| 6,202,105 B1 | 3/2001 | Gates et al. | 710/20 |
| 6,223,242 B1 | 4/2001 | Sheafor et al. | 710/132 |
| 6,226,680 B1 | 5/2001 | Boucher et al. | 709/230 |
| 6,246,683 B1 | 6/2001 | Connery et al. | 370/392 |
| 6,247,060 B1 | 6/2001 | Boucher et al. | 709/238 |
| 6,279,051 B1 | 8/2001 | Gates et al. | 710/20 |
| 6,289,023 B1 | 9/2001 | Dowling et al. | 370/419 |
| 6,298,403 B1 | 10/2001 | Suri et al. | 710/100 |
| 6,324,649 B1 | 11/2001 | Eyres et al. | 713/202 |
| 6,334,153 B2 | 12/2001 | Boucher et al. | 709/230 |
| 6,343,360 B1 | 1/2002 | Feinleib | 713/1 |
| 6,345,301 B1 | 2/2002 | Burns et al. | 709/230 |
| 6,345,302 B1 * | 2/2002 | Bennett et al. | 709/236 |
| 6,356,951 B1 | 3/2002 | Gentry et al. | 709/250 |
| 6,370,599 B1 | 4/2002 | Anand et al. | 710/15 |
| 6,385,647 B1 | 5/2002 | Willis et al. | 709/217 |
| 6,389,468 B1 | 5/2002 | Muller et al. | 709/226 |
| 6,389,479 B1 | 5/2002 | Boucher | 709/243 |
| 6,393,487 B2 | 5/2002 | Boucher et al. | 709/238 |
| 6,421,742 B1 | 7/2002 | Tillier | 710/1 |
| 6,421,753 B1 | 7/2002 | Hoese et al. | 710/129 |
| 6,427,169 B1 | 7/2002 | Elzur | 709/224 |
| 6,427,171 B1 | 7/2002 | Craft et al. | 709/230 |
| 6,427,173 B1 | 7/2002 | Boucher et al. | 709/238 |
| 6,434,620 B1 | 8/2002 | Boucher et al. | 709/230 |
| 6,434,651 B1 | 8/2002 | Gentry, Jr. | 710/260 |
| 6,449,656 B1 | 9/2002 | Elzur et al. | 709/236 |
| 6,453,360 B1 | 9/2002 | Muller et al. | 709/250 |
| 6,470,415 B1 | 10/2002 | Starr et al. | 711/104 |
| 6,473,425 B1 | 10/2002 | Bellaton et al. | 370/392 |
| 6,480,489 B1 | 11/2002 | Muller et al. | 370/389 |
| 6,487,202 B1 | 11/2002 | Klausmeier et al. | 370/395 |
| 6,487,654 B2 | 11/2002 | Dowling | 712/244 |
| 6,490,631 B1 * | 12/2002 | Teich et al. | 709/250 |
| 6,502,144 B1 | 12/2002 | Accarie | 710/8 |
| 6,523,119 B2 | 2/2003 | Pavlin et al. | 713/192 |
| 6,526,446 B1 | 2/2003 | Yang et al. | 709/230 |
| 6,570,884 B1 | 5/2003 | Connery et al. | 370/419 |
| 6,591,302 B2 | 7/2003 | Boucher et al. | 709/230 |
| 6,591,310 B1 | 7/2003 | Johnson | 710/3 |

| | | | |
|---|---|---|---|
| 6,648,611 B2 | 11/2003 | Morse et al. | 417/310 |
| 6,650,640 B1 | 11/2003 | Muller et al. | 370/392 |
| 6,657,757 B1 | 12/2003 | Chang et al. | 359/124 |
| 6,658,480 B2 | 12/2003 | Boucher et al. | 709/239 |
| 6,678,283 B1 | 1/2004 | Teplitsky | 370/463 |
| 6,681,364 B1 | 1/2004 | Calvignac et al. | 714/776 |
| 6,181,705 B1 | 2/2004 | Kim | 370/392 |
| 6,687,758 B2 | 2/2004 | Craft et al. | 709/250 |
| 6,697,868 B2 | 2/2004 | Craft et al. | 709/230 |
| 6,751,665 B2 | 6/2004 | Philbrick et al. | 709/224 |
| 6,757,746 B2 | 6/2004 | Boucher et al. | 709/250 |
| 6,765,901 B1 | 7/2004 | Johnson et al. | 370/352 |
| 6,807,581 B1 | 10/2004 | Starr et al. | 709/250 |
| 6,842,896 B1 | 1/2005 | Redding et al. | 717/172 |
| 6,912,522 B2 | 6/2005 | Edgar | 707/2 |
| 6,938,092 B2 | 8/2005 | Burns | 709/230 |
| 6,941,386 B2 | 9/2005 | Craft et al. | 709/250 |
| 6,965,941 B2 | 11/2005 | Boucher et al. | 709/230 |
| 6,996,070 B2 | 2/2006 | Starr et al. | 370/252 |
| 7,042,898 B2 | 5/2006 | Blightman et al. | 370/463 |
| 7,076,568 B2 | 7/2006 | Philbrick et al. | 709/250 |
| 7,089,326 B2 | 8/2006 | Boucher et al. | 709/242 |
| 7,093,099 B2 | 8/2006 | Bodas et al. | 711/206 |
| 7,124,205 B2 | 10/2006 | Craft et al. | 709/250 |
| 7,133,940 B2 | 11/2006 | Blightman et al. | 710/22 |
| 7,167,926 B1 | 1/2007 | Boucher et al. | 709/250 |
| 7,167,927 B2 | 1/2007 | Philbrick et al. | 709/250 |
| 7,174,393 B2 | 2/2007 | Boucher et al. | 709/250 |
| 7,185,266 B2 | 2/2007 | Blightman et al. | 714/776 |
| 7,191,241 B2 | 3/2007 | Boucher et al. | 709/230 |
| 7,191,318 B2 | 3/2007 | Tripathy et al. | 712/225 |
| 7,237,036 B2 | 6/2007 | Boucher et al. | 709/245 |
| 7,254,696 B2 | 8/2007 | Mittal et al. | 712/210 |
| 7,284,070 B2 | 10/2007 | Boucher et al. | 709/250 |
| 2001/0025315 A | 1/2001 | Jolitz | |
| 2001/0004354 A1 | 6/2001 | Jolitz | |
| 2001/0013059 A1 | 8/2001 | Dawson et al. | |
| 2001/0014892 A1 | 8/2001 | Gaither et al. | |
| 2001/0014954 A1 | 8/2001 | Purcell et al. | |
| 2001/0048681 A1 | 12/2001 | Bilic et al. | |
| 2001/0053148 A1 | 12/2001 | Bilic et al. | |
| 2002/0073223 A1 | 6/2002 | Darnell et al. | 709/232 |
| 2002/0112175 A1 | 8/2002 | Makofka et al. | 713/200 |
| 2003/0014544 A1* | 1/2003 | Pettey | 709/249 |
| 2003/0066011 A1 | 4/2003 | Oren | |
| 2003/0110344 A1 | 6/2003 | Szezepanek et al. | 711/100 |
| 2003/0165160 A1 | 9/2003 | Minami et al. | |
| 2004/0054814 A1 | 3/2004 | McDaniel | |
| 2004/0059926 A1 | 3/2004 | Angelo et al. | 713/168 |
| 2004/0153578 A1 | 8/2004 | Elzur | |
| 2004/0213290 A1 | 10/2004 | Johnson et al. | 370/469 |
| 2004/0246974 A1 | 12/2004 | Gyugyi et al. | 370/395.31 |

FOREIGN PATENT DOCUMENTS

| | | |
|---|---|---|
| WO | WO 98/19412 | 5/1998 |
| WO | WO 98/50852 | 11/1998 |
| WO | WO 99/04343 | 1/1999 |
| WO | WO 99/65219 | 12/1999 |
| WO | WO 00/13091 | 3/2000 |
| WO | WO 01/04770 | 1/2001 |
| WO | WO 01/05107 | 1/2001 |
| WO | WO 01/05116 | 1/2001 |
| WO | WO 01/05123 | 1/2001 |
| WO | WO 01/40960 | 6/2001 |
| WO | WO 01/59966 | 8/2001 |
| WO | WO 01/86430 | 11/2001 |

OTHER PUBLICATIONS

Internet pages entitled "Hardware Assisted Protocol Processing", (which Eugene Feinber is working on), 1 page, printed Nov. 25, 1998.
Zilog product Brief entitled "Z85C30 CMOS SCC Serial Communication Controller", Zilog Inc., 3 pages, 1997.
Internet pages of Xpoint Technologies, Inc. entitled "Smart LAN Work Requests", 5 pages, printed Dec. 19, 1997.
Internet pages entitled: Asante and 100BASE-T Fast Ethernet. 7 pages, printed May 27, 1997.
Internet pages entitled: A Guide to the Paragon XP/S-A7 Supercomputer at Indiana University. 13 pages, printed Dec. 21, 1998.
Richard Stevens, "TCP/IP Illustrated, vol. 1, The Protocols", pp. 325-326 (1994).
Internet pages entitled: Northridge/Southbridge vs. Intel Hub Architecture, 4 pages, printed Feb. 19, 2001.
Gigabit Ethernet Technical Brief, Achieving End-to-End Performance. Alteon Networks, Inc., First Edition, Sep. 1996, 15 pages.
Internet pages directed to Technical Brief on Alteon Ethernet Gigabit NIC technology, www.alteon.com, 14 pages, printed Mar. 15, 1997.
VIA Technologies, Inc. article entitled "VT8501 Apollo MVP4", pp. i-iv, 1-11, cover and copyright page, revision 1.3, Feb. 1, 2000.
iReady News Archives article entitled "iReady Rounding Out Management Team with Two Key Executives", http://www.ireadyco.com/archives/keyexec.html, 2 pages, printed Nov. 28, 1998.
"Toshiba Delivers First Chips to Make Consumer Devices Internet-Ready Based On iReady's Design," Press Release Oct. 1998, 3 pages, printed Nov. 28, 1998.
Internet pages from iReady Products, web sitehttp://www.ireadyco.com/products,html, 2 pages, downloaded Nov. 25, 1998.
iReady News Archives, Toshiba, iReady shipping Internet chip, 1 page, printed Nov. 25, 1998.
Interprophet article entitled "Technology", http://www.interprophet.com/technology.html, 17 pages, printed Mar. 1, 2000.
iReady article entitled "About Us Introduction", Internet pages fromhttp://www.iReadyco.com/about.html, 3 pages, printed Nov. 25, 1998.
iReady News Archive article entitled "Revolutionary Approach to Consumer Electronics Internet Connectivity Funded", San Jose, CA, Nov. 20, 1997. 2 pages, printed Nov. 2, 1998.
iReady News Archive article entitled "Seiko Instruments Inc. (SII) Introduces World's First Internet-Ready Intelligent LCD Modules Based on Iready Technology," Santa Clara, CA and Chiba, Japan, Oct. 26, 1998. 2 pages, printed Nov. 2, 1998.
NEWSwatch article entitled "iReady internet Tuner to Web Enable Devices", Tuesday, Nov. 5, 1996, printed Nov. 2, 1998, 2 pages.
EETimes article entitled "Tuner for Toshiba, Toshiba Taps iReady for Internet Tuner", by David Lammers, 2 pages, printed Nov. 2, 1998.
"Comparison of Novell Netware and TCP/IP Protocol Architectures", by J.S. Carbone, 19 pages, printed Apr. 10, 1998.
Adaptec article entitled "AEA-7110C-a DuraSAN product", 11 pages, printed Oct. 1, 2001.
iSCSI HBA article entitled "iSCSI and 2Gigabit fibre Channel Host Bus Adapters from Emulex, QLogic, Adaptec, JNI", 8 pages, printed Oct. 1, 2001.
iSCSI HBA article entitled "FCE-3210/6410 32 and 64-bit PCI-to-Fibre Channel HBA", 6 pages, printed Oct. 1, 2001.
ISCSI.com article entitled "iSCSI Storage", 2 pages, printed Oct. 1, 2001.
"Two-Way TCP Traffic Over Rate Controlled Channels: Effects and Analysis", by Kalampoukas et al., IEEE Transactions on Networking, vol. 6, No. 6, Dec. 1998, 17 pages.
IReady News article entitled "Toshiba Delivers First Chips to Make Consumer Devices Internet-Ready Based on iReady Design", Santa Clara, CA, and Tokyo, Japan, Oct. 14, 1998, printed Nov. 2, 1998, 3 pages.
Internet pages of InterProphet entitled "Frequently Asked Questions", by Lynne Jolitz, printed Jun. 14, 2000, 4 pages.
"File System Design For An NFS File Server Appliance", Article by D. Hitz, et al., 13 pages.
Adaptec Press Release article entitled "Adaptec Announces EtherStorage Technology", 2 pages, May 4, 2000, printed Jun. 14, 2000.
Adaptec article entitled "EtherStorage Frequently Asked Questions", 5 pages, printed Jul. 19, 2000.
Adaptec article entitled "EtherStorage White Paper", 7 pages, printed Jul. 19, 2000.

CIBC World Markets article entitled "Computers; Storage", by J. Berlino et al., 9 pages, dated Aug. 7, 2000.

Merrill Lynch article entitled "Storage Futures", by S. Milunovich, 22 pages, dated May 10, 2000.

CBS Market Watch article entitled "Montreal Start-Up Battles Data Storage Botttleneck", by S. Taylor, dated Mar. 5, 2000, 2 pages, printed Mar. 7, 2000.

Internet-draft article entitled "SCSI/TCP (SCSI over TCP)", by J. Satran et al., 38 pages, dated Feb. 2000, printed May 19, 2000.

Internet pages entitled Technical White Paper-Xpoint's Disk to LAN Acceleration Solution for Windows NT Server, printed Jun. 5, 1997, 15 pages.

Jato Technologies article entitled Network Accelerator Chip Architecture, twelve-slide presentation, printed Aug. 19, 1998, 13 pages.

EETimes article entitled Enterprise System Uses Flexible Spec, dated Aug. 10, 1998, printed Nov. 25, 1998, 3 pages.

Internet pages entitled "Smart Ethernet Network Interface Cards", which Berend Ozceri is developing, printed Nov. 25, 1998, 2 pages.

Internet pages of Xaqti corporation entitled "GigaPower Protocol Processor Product Review," printed Nov. 25, 1999, 4 pages.

Internet pages entitled "DART: Fast Application Level Networking via Data-Copy Avoidance," by Robert J. Walsh, printed Jun. 3, 1999, 25 pages.

Schwaderer et al., IEEE Computer Society Press publication entitled, "XTP in VLSI Protocol Decomposition for ASIC Implementation", from 15th Conference on Local Computer Networks, 5 pages, Sep. 30-Oct. 3, 1990.

Beach, Bob, IEEE Computer Society Press publication entitled, "UltraNet: An Architecture for Gigabit Networking", from 15th Conference on Local Computer Networks, 18 pages, Sep. 30-Oct. 3, 1990.

Chesson et al., IEEE Symposium Record entitled, "The Protocol Engine Chipset", from Hot Chips III, 16 pages, Aug. 26-27, 1991.

Maclean et al., IEEE Global Telecommunications Conference, Globecom '91, presentation entitled, "An Outboard Processor for High Performance Implementation of Transport Layer Protocols", 7 pages, Dec. 2-5, 1991.

Ross et al., IEEE article entitled "FX1000: A high performance single chip Gigabit Ethernet NIC", from Compcon '97 Proceedings, 7 pages, Feb. 23-26, 1997.

Strayer et al., "Ch. 9: The Protocol Engine" from XTP: The Transfer Protocol, 12 pages, Jul. 1992.

Publication entitled "Protocol Engine Handbook", 44 pages, Oct. 1990.

Koufopavlou et al., IEEE Global Telecommunications Conference, Globecom '92, presentation entitled, "Parallel TCP for High Performance Communication Subsystems", 7 pages, Dec. 6-9, 1992.

Lilienkamp et al., Publication entitled "Proposed Host-Front End Protocol", 56 pages, Dec. 1984.

Andrew S. Tanenbaum, Computer Networks, Third Edition, 1996, ISBN 0-13-349945-6.

Rice University article entitled "LRP: A Network Subsystem Architecture for Server Systems", by P. Druschel and G. Banga, 14 pages, Oct. 1996.

Internet RFC/STD/FYI/BCP Archives article with heading "RFC2140" entitled "TCP Control Block Interdependence", web address http://www.faqs.org/ftp/rfc/pdf/rfc2140.txt.pdf, 11 pages, Apr. 1997.

WindRiver article entitled "Tornado: For Intelligent Network Acceleration", copyright Wind River Systems, 2001, 2 pages.

WindRiver White Paper entitled "Complete TCP/IP Offload for High-Speed Ethernet Networks", Copyright Wind River Systems, 2002, 7 pages.

Intel article entitled "Solving Server Bottlenecks with Intel Server Adapters", Copyright Intel Corporation, 1999, 8 pages.

Koufopavlou et al., IEEE Global Telecommunications Conference, Globecom '92, presentation entitled, "Parallel TCP for High Performance Communication Subsystems", 7 pages, Dec. 6-9, 1992.

Thia, Y.H. Publication entitled "High-Speed OSI Protocol Bypass Algorithm with Window Flow Control", *Protocols for High Speed Networks*, pp. 53-68, 1993.

Thia, Y.H. Publication entitled "A Reduced Operational Protocol Engine (ROPE) for a multiple-layer bypass architecture", *Protocols for High Speed Networks*, pp. 224-239, 1995.

U.S. Appl. No. 60/053,240, Titled: TCP/IP Network Accelerator and Method of Use, filed Jul. 18, 1997, Inventors: Jolitz et al., Assignee: InterProphet LLC.

U.S. Appl. No. 60/283,896, Titled: CRC Calculations for Out of Order PUDs, filed Apr. 12, 2003, Inventor: Amit Oren, Assignee: Siliquent Technologies Ltd.

Form 10-K for Excelan, Inc., for the fiscal year ending Dec. 31, 1987 (10 pages).

Form 10-K for Excelan, Inc., for the fiscal year ending Dec. 31, 1988 (10 pages).

\* cited by examiner

*Primary Examiner*—Wen-Tai Lin
(74) *Attorney, Agent, or Firm*—Silicon Edge Law Group, LLP; Mark Lauer

(57) ABSTRACT

A system for protocol processing in a computer network has an intelligent network interface card (INIC) or communication processing device (CPD) associated with a host computer. The CPD provides a fast-path that avoids protocol processing for most large multipacket messages, greatly accelerating data communication. The CPD also assists the host CPU for those message packets that are chosen for processing by host software layers. A context for a message is defined that allows DMA controllers of the CPD to move data, free of headers, directly to or from a destination or source in the host. The context can be stored as a communication control block (CCB) that is controlled by either the CPD or by the host CPU. The CPD contains specialized hardware circuits that process media access control, network and transport layer headers of a packet received from the network, saving the host CPU from that processing for fast-path messages.

40 Claims, 21 Drawing Sheets

INTELLIGENT NETWORK INTERFACE SYSTEM AND METHOD FOR ACCELERATED PROTOCOL PROCESSING

CROSS-REFERENCE TO RELATED APPLICATIONS

The present application claims the benefit under 35 USC § 120 of (is a continuation of) U.S. patent application Ser. No. 09/802,550, filed Mar. 9, 2001, now U.S. Pat. No. 6,658,480 which claims the benefit under 35 USC § 120 of (is a continuation-in-part of) U.S. patent application Ser. No. 09/067,544, filed Apr. 27, 1998, now U.S. Pat. No. 6,226,680 which claims the benefit under 35 USC § 119 of U.S. patent application Ser. No. 60/061,809, filed Oct. 14, 1997. U.S. patent application Ser. No. 09/802,550, filed Mar. 9, 2001, also claims the benefit under 35 USC § 120 of (is a continuation-in-part of) U.S. patent application Ser. No. 09/141,713, filed Aug. 28, 1998, now U.S. Pat. No. 6,389,479 which claims the benefit under 35 USC § 119 of U.S. patent application Ser. No. 60/098,296, filed Aug. 27, 1998. U.S. patent application Ser. No. 09/802,550, filed Mar. 9, 2001, also claims the benefit under 35 USC § 120 of (is a continuation-in-part of) U.S. patent application Ser. No. 09/384,792, filed Aug. 27, 1999, now U.S. Pat. No. 6,434,620 (is a continuation-in-part of) U.S. patent application Ser. No. 09/416,925, filed Oct. 13, 1999, now U.S. Pat. No. 6,470,415 (is a continuation-in-part of) U.S. patent application Ser. No. 09/439,603, filed Nov. 12, 1999, now U.S. Pat. No. 6,247,060 (is a continuation-in-part of) U.S. patent application Ser. No. 09/464,283, filed Dec. 15, 1999, now U.S. Pat. No. 6,427,173 U.S. patent application Ser. No. 09/514,425, filed Feb. 28, 2000, (is a continuation-in-part of) U.S. patent application Ser. No. 09/675,484, filed Sep. 29, 2000, now U.S. Pat. No. 6,807,581 (is a continuation-in-part of) U.S. patent application Ser. No. 09/675,700, filed Sep. 29, 2000, (is a continuation-in-part of) U.S. patent application Ser. No. 09/692,561, filed Oct. 18, 2000, (is a continuation-in-part of) U.S. patent application Ser. No. 09/748,936, filed Dec. 26, 2000, now U.S. Pat. No. 6,334,153 (is a continuation-in-part of) U.S. patent application Ser. No. 09/789,366, filed Feb. 20, 2001, now U.S. Pat. No. 6,757,746 (is a continuation-in-part of) U.S. patent application Ser. No. 09/801,488, filed Mar. 7, 2001, now U.S. Pat. No. 6,687,758 (is a continuation-in-part of) U.S. patent application Ser. No. 09/802,551, filed Mar. 9, 2001, (is a continuation-in-part of) U.S. patent application Ser. No. 09/802,426, filed Mar. 9, 2001, and (is a continuation-in-part of) U.S. patent application Ser. No. 10/005,536, filed Nov. 7, 2001. All of the applications listed above are incorporated by reference herein.

TECHNICAL FIELD

The present invention relates generally to computer or other networks, and more particularly to protocol processing for information communicated between hosts such as computers connected to a network.

BACKGROUND

The advantages of network computing are increasingly evident. The convenience and efficiency of providing information, communication or computational power to individuals at their personal computer or other end user devices has led to rapid growth of such network computing, including internet as well as intranet systems and applications.

As is well known, most network computer communication is accomplished with the aid of a layered software architecture for moving information between host computers connected to the network. The layers help to segregate information into manageable segments, the general functions of each layer often based on an international standard called Open Systems Interconnection (OSI). OSI sets forth seven processing layers through which information may pass when received by a host in order to be presentable to an end user. Similarly, transmission of information from a host to the network may pass through those seven processing layers in reverse order. Each step of processing and service by a layer may include copying the processed information. Another reference model that is widely implemented, called TCP/IP (TCP stands for transport control protocol, while IP denotes internet protocol) essentially employs five of the seven layers of OSI.

Networks may include, for instance, a high-speed bus such as an Ethernet connection or an internet connection between disparate local area networks (LANs), each of which includes multiple hosts, or any of a variety of other known means for data transfer between hosts. According to the OSI standard, physical layers are connected to the network at respective hosts, the physical layers providing transmission and receipt of raw data bits via the network. A data link layer is serviced by the physical layer of each host, the data link layers providing frame division and error correction to the data received from the physical layers, as well as processing acknowledgment frames sent by the receiving host. A network layer of each host is serviced by respective data link layers, the network layers primarily controlling size and coordination of subnets of packets of data.

A transport layer is serviced by each network layer and a session layer is serviced by each transport layer within each host. Transport layers accept data from their respective session layers and split the data into smaller units for transmission to the other host's transport layer, which concatenates the data for presentation to respective presentation layers. Session layers allow for enhanced communication control between the hosts. Presentation layers are serviced by their respective session layers, the presentation layers translating between data semantics and syntax which may be peculiar to each host and standardized structures of data representation. Compression and/or encryption of data may also be accomplished at the presentation level. Application layers are serviced by respective presentation layers, the application layers translating between programs particular to individual hosts and standardized programs for presentation to either an application or an end user. The TCP/IP standard includes the lower four layers and application layers, but integrates the functions of session layers and presentation layers into adjacent layers. Generally speaking, application, presentation and session layers are defined as upper layers, while transport, network and data link layers are defined as lower layers.

The rules and conventions for each layer are called the protocol of that layer, and since the protocols and general functions of each layer are roughly equivalent in various hosts, it is useful to think of communication occurring directly between identical layers of different hosts, even though these peer layers do not directly communicate without information transferring sequentially through each layer below. Each lower layer performs a service for the layer immediately above it to help with processing the communicated information. Each layer saves the information for processing and service to the next layer. Due to the multiplicity of hardware and software architectures, systems and programs commonly employed, each layer is necessary to insure that the data can make it to the intended destination in the appropriate form, regardless of variations in hardware and software that may intervene.

In preparing data for transmission from a first to a second host, some control data is added at each layer of the first host regarding the protocol of that layer, the control data being indistinguishable from the original (payload) data for all lower layers of that host. Thus an application layer attaches an application header to the payload data and sends the combined data to the presentation layer of the sending host, which receives the combined data, operates on it and adds a presentation header to the data, resulting in another combined data packet. The data resulting from combination of payload data, application header and presentation header is then passed to the session layer, which performs required operations including attaching a session header to the data and presenting the resulting combination of data to the transport layer. This process continues as the information moves to lower layers, with a transport header, network header and data link header and trailer attached to the data at each of those layers, with each step typically including data moving and copying, before sending the data as bit packets over the network to the second host.

The receiving host generally performs the converse of the above-described process, beginning with receiving the bits from the network, as headers are removed and data processed in order from the lowest (physical) layer to the highest (application) layer before transmission to a destination of the receiving host. Each layer of the receiving host recognizes and manipulates only the headers associated with that layer, since to that layer the higher layer control data is included with and indistinguishable from the payload data. Multiple interrupts, valuable central processing unit (CPU) processing time and repeated data copies may also be necessary for the receiving host to place the data in an appropriate form at its intended destination.

The above description of layered protocol processing is simplified, as college-level textbooks devoted primarily to this subject are available, such as Computer Networks, Third Edition (1996) by Andrew S. Tanenbaum, which is incorporated herein by reference. As defined in that book, a computer network is an interconnected collection of autonomous computers, such as internet and intranet systems, including local area networks (LANs), wide area networks (WANs), asynchronous transfer mode (ATM), ring or token ring, wired, wireless, satellite or other means for providing communication capability between separate processors. A computer is defined herein to include a device having both logic and memory functions for processing data, while computers or hosts connected to a network are said to be heterogeneous if they function according to different operating systems or communicate via different architectures.

As networks grow increasingly popular and the information communicated thereby becomes increasingly complex and copious, the need for such protocol processing has increased. It is estimated that a large fraction of the processing power of a host CPU may be devoted to controlling protocol processes, diminishing the ability of that CPU to perform other tasks. Network interface cards have been developed to help with the lowest layers, such as the physical and data link layers. It is also possible to increase protocol processing speed by simply adding more processing power or CPUs according to conventional arrangements. This solution, however, is both awkward and expensive. But the complexities presented by various networks, protocols, architectures, operating systems and applications generally require extensive processing to afford communication capability between various network hosts.

SUMMARY

The current invention provides a system for processing network communication that greatly increases the speed of that processing and the efficiency of moving the data being communicated. The invention has been achieved by questioning the long-standing practice of performing multilayered protocol processing on a general-purpose processor. The protocol processing method and architecture that results effectively collapses the layers of a connection-based, layered architecture such as TCP/IP into a single wider layer which is able to send network data more directly to and from a desired location or buffer on a host. This accelerated processing is provided to a host for both transmitting and receiving data, and so improves performance whether one or both hosts involved in an exchange of information have such a feature.

The accelerated processing includes employing representative control instructions for a given message that allow data from the message to be processed via a fast-path which accesses message data directly at its source or delivers it directly to its intended destination. This fast-path bypasses conventional protocol processing of headers that accompany the data. The fast-path employs a specialized microprocessor designed for processing network communication, avoiding the delays and pitfalls of conventional software layer processing, such as repeated copying and interrupts to the CPU. In effect, the fast-path replaces the states that are traditionally found in several layers of a conventional network stack with a single state machine encompassing all those layers, in contrast to conventional rules that require rigorous differentiation and separation of protocol layers. The host retains a sequential protocol processing stack which can be employed for setting up a fast-path connection or processing message exceptions. The specialized microprocessor and the host intelligently choose whether a given message or portion of a message is processed by the microprocessor or the host stack.

DETAILED DESCRIPTION

Figure 1:
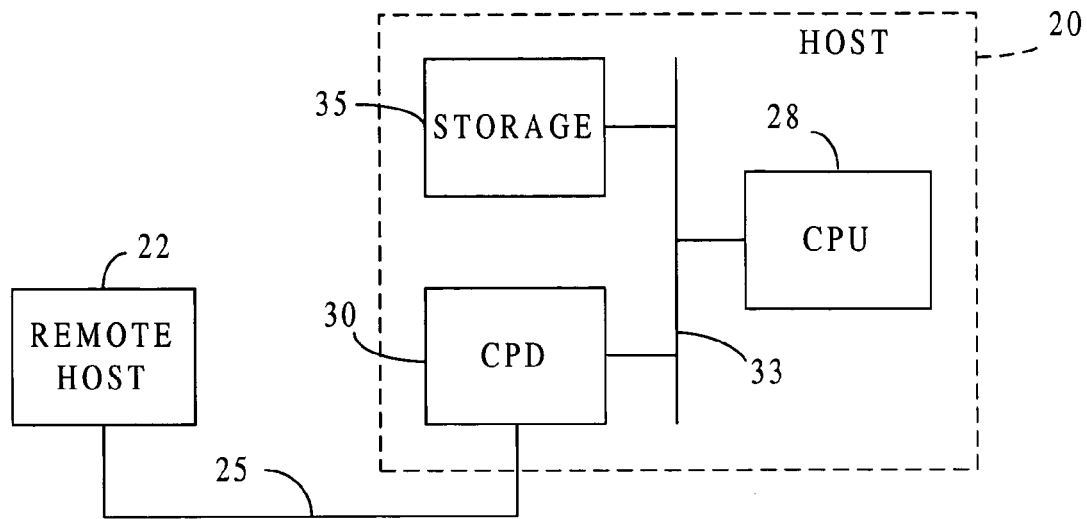
FIG. 1 is a plan view diagram of a system of the present invention, including a host computer having a communication-processing device for accelerating network communication.

FIG. 1 shows a host 20 of the present invention connected by a network 25 to a remote host 22. The increase in processing speed achieved by the present invention can be provided with an intelligent network interface card (INIC) that is easily and affordably added to an existing host, or with a communication processing device (CPD) that is integrated into a host, in either case freeing the host CPU from most protocol processing and allowing improvements in other tasks performed by that CPU. The host 20 in a first embodiment contains a CPU 28 and a CPD 30 connected by a host bus 33. The CPD 30 includes a microprocessor designed for processing communication data and memory buffers controlled by a direct memory access (DMA) unit. Also connected to the host bus 33 is a storage device 35, such as a semiconductor memory or disk drive, along with any related controls.

Figure 2:
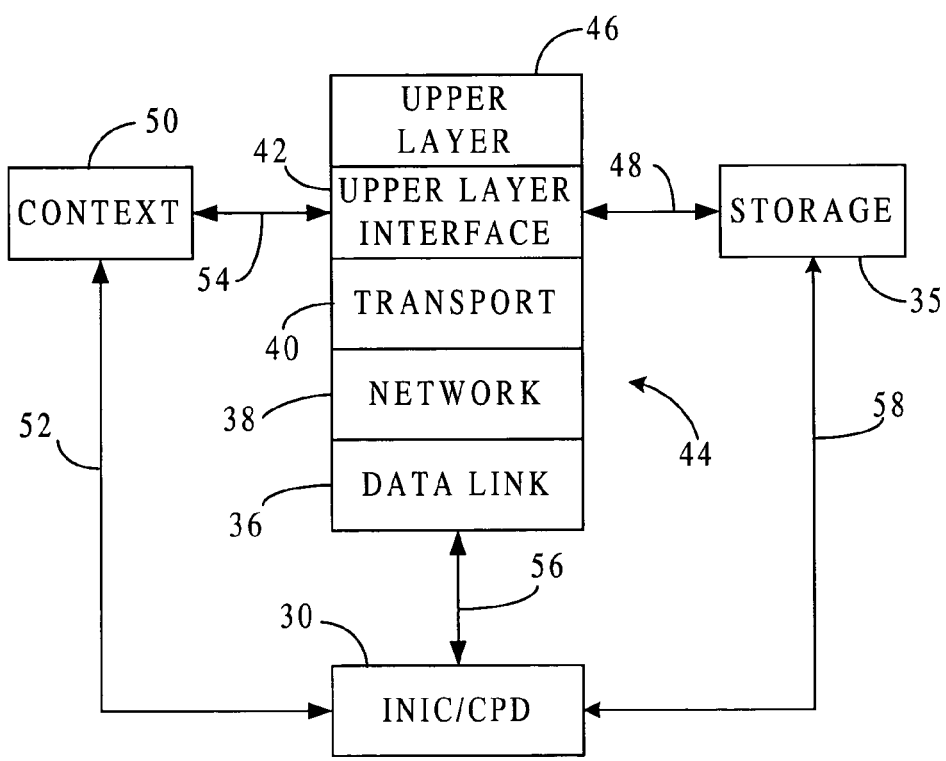
FIG. 2 is a diagram of information flow for the host of FIG. 1 in processing network communication, including a fast-path, a slow-path and a transfer of connection context between the fast and slow-paths.

Referring additionally to FIG. 2, the host CPU 28 runs a protocol processing stack 44 housed in storage 35, the stack including a data link layer 36, network layer 38, transport layer 40, upper layer 46 and an upper layer interface 42. The upper layer 46 may represent a session, presentation and/or application layer, depending upon the particular protocol being employed and message communicated. The upper layer interface 42, along with the CPU 28 and any related controls, can send or retrieve a file to or from the upper layer 46 or storage 35, as shown by arrow 48. A connection context 50 has been created, as will be explained below, the context summarizing various features of the connection, such as protocol type and source and destination addresses for each protocol layer. The context may be passed between an interface for the session layer 42 and the CPD 30, as shown by arrows 52 and 54, and stored as a communication control block (CCB) at either CPD 30 or storage 35. Control of the CCB can pass between the CPU and the CPD while the CCB remains in storage 35.

When the CPD 30 owns a CCB defining a particular connection, data received by the CPD from the network and pertaining to the connection is referenced to that CCB and can then be sent directly to storage 35 according to a fast-path 58, bypassing sequential protocol processing by the data link 36, network 38 and transport 40 layers. Transmitting a message, such as sending a file from storage 35 to remote host 22, can also occur via the fast-path 58, in which case the context for the file data is added by the CPD 30 referencing a CCB, rather than by CPU 28 sequentially adding headers during processing by the transport 40, network 38 and data link 36 layers. The DMA controllers of the CPD 30 perform these transfers between CPD and storage 35.

The CPD 30 can collapse multiple protocol stacks each having possible separate states into one or more state machines for fast-path processing. As a result, exception conditions may occur that are not provided for in the single state machine, primarily because such conditions occur infrequently and to deal with them on the CPD would provide little or no performance benefit to the host. Such exceptions can be detected by CPD 30 or CPU 28. An advantage of the invention includes the manner in which unexpected situations that occur on a fast-path CCB are handled. The CPD 30 can deal with these rare situations by passing back to the host protocol stack 44 control of the CCB and any associated message frames involved, via a control negotiation. The exception condition is then processed in a conventional manner by the host protocol stack 44. At some later time, usually directly after the handling of the exception condition has completed and fast-path processing can resume, the host stack 44 hands control of the CCB back to the CPD.

This fallback capability enables the performance-impacting functions of the host protocols to be handled by the CPD network microprocessor, while the exceptions are dealt with by the host stacks, the exceptions being so rare as to negligibly effect overall performance. The custom designed network microprocessor can have independent processors for transmitting and receiving network information, and further processors for assisting and queuing, or a single processor can run all the code. One microprocessor embodiment includes a pipelined trio of receive, transmit and utility processors. Direct memory access (DMA) controllers can be integrated into the CPD to work in close concert with the network microprocessor to quickly move data between buffers within the CPD and other locations such as long term storage. Providing buffers within the CPD reduces host bus traffic by allowing transfers directly to application memory.

Figure 3:
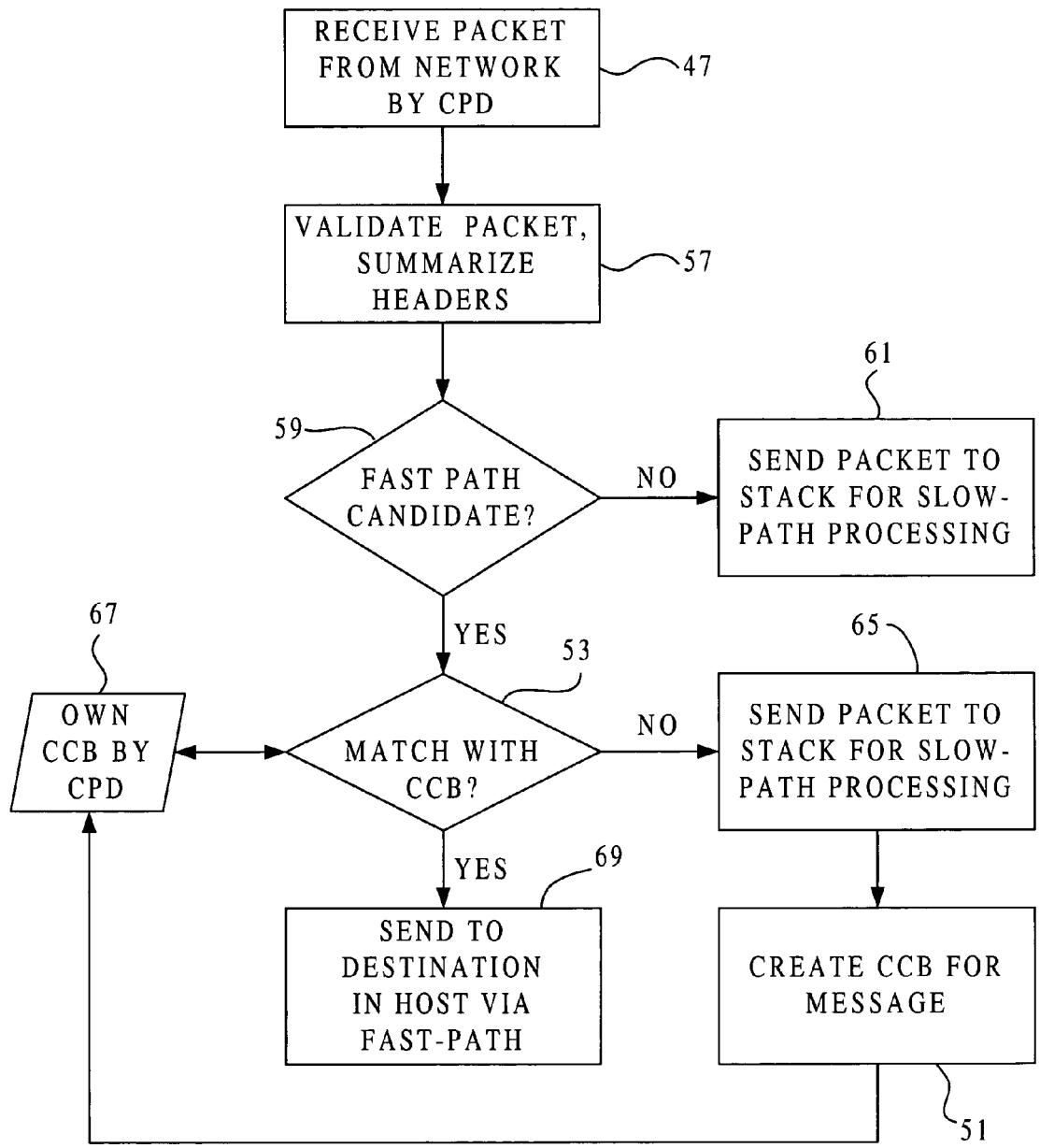
FIG. 3 is a flow chart of message receiving according to the present invention.

FIG. 3 diagrams the general flow of messages received according to the current invention. A large TCP/IP message such as a file transfer may be received by the host from the network in a number of separate, approximately 64 KB transfers, each of which may be split into many, approximately 1.5 KB frames or packets for transmission over a network. Novel NetWare protocol suites running Sequenced Packet Exchange Protocol (SPX) or NetWare Core Protocol (NCP) over Internetwork Packet Exchange (IPX) work in a similar fashion. Another form of data communication which can be handled by the fast-path is Transaction TCP (hereinafter T/TCP or TTCP), a version of TCP which initiates a connection with an initial transaction request after which a reply containing data may be sent according to the connection, rather than initiating a connection via a multi-message initialization dialogue and then transferring data with later messages. In any of the transfers typified by these protocols, each packet conventionally includes a portion of the data being transferred, as well as headers for each of the protocol layers and markers for positioning the packet relative to the rest of the packets of this message.

When a message packet or frame is received 47 from a network by the CPD, it is first validated by a hardware assist. This includes determining the protocol types of the various layers, verifying relevant checksums, and summarizing 57 these findings in a status word or words. Included in these words is an indication whether or not the frame is a candidate for fast-path data flow. Selection 59 of fast-path candidates is based on whether the host may benefit from this message connection being handled by the CPD, which includes determining whether the packet has header bytes denoting particular protocols, such as TCP/IP or SPX/IPX for example. The small percent of frames that are not fast-path candidates are sent 61 to the host protocol stacks for slow-path protocol processing. Subsequent network microprocessor work with each fast-path candidate can determine whether a fast-path connection such as a TCP or SPX CCB is already extant for that candidate, or whether that candidate may be used to set up a new fast-path connection, such as for a TTCP/IP transaction. The validation provided by the CPD provides acceleration regardless of whether a frame is processed by the fast-path or the slow-path, by only providing error free, validated frames to the host CPU for processing.

All received message frames which have been determined by the CPD hardware assist to be fast-path candidates are examined 53 by the network microprocessor or INIC comparator circuits to determine whether they correspond to a CCB controlled by the CPD. Upon confirming such a match, the CPD removes lower layer headers and sends 69 the remaining application data from the frame directly into its final destination in the host using the DMA units of the CPD. This operation may occur immediately upon receipt of a message packet, for example when a TCP connection already exists and destination buffers have been negotiated, or it may first be necessary to process an initial header to acquire a new set of final destination addresses for this transfer. In this latter case, the CPD will queue subsequent message packets while waiting for the destination address, and then DMA the queued application data to that destination.

A fast-path candidate that does not correspond to a CCB may be used to set up a new fast-path connection, by sending 65 the frame to the host for sequential protocol processing. In this case, the host uses this frame to create 51 a CCB, for which ownership which is then passed 67 to the CPD to control subsequent frames on that connection. The CCB, which can be cached in or otherwise controlled by the CPD, includes control and state information pertinent to all protocols that would have been processed had conventional software layer processing been employed. The CCB also contains storage space for per-transfer information used to facilitate moving application-level data contained within subsequent related message packets directly to a host application in a form available for immediate usage. The CPD takes over communication processing for that connection upon receiving control of the CCB from the host.

Figure 4:
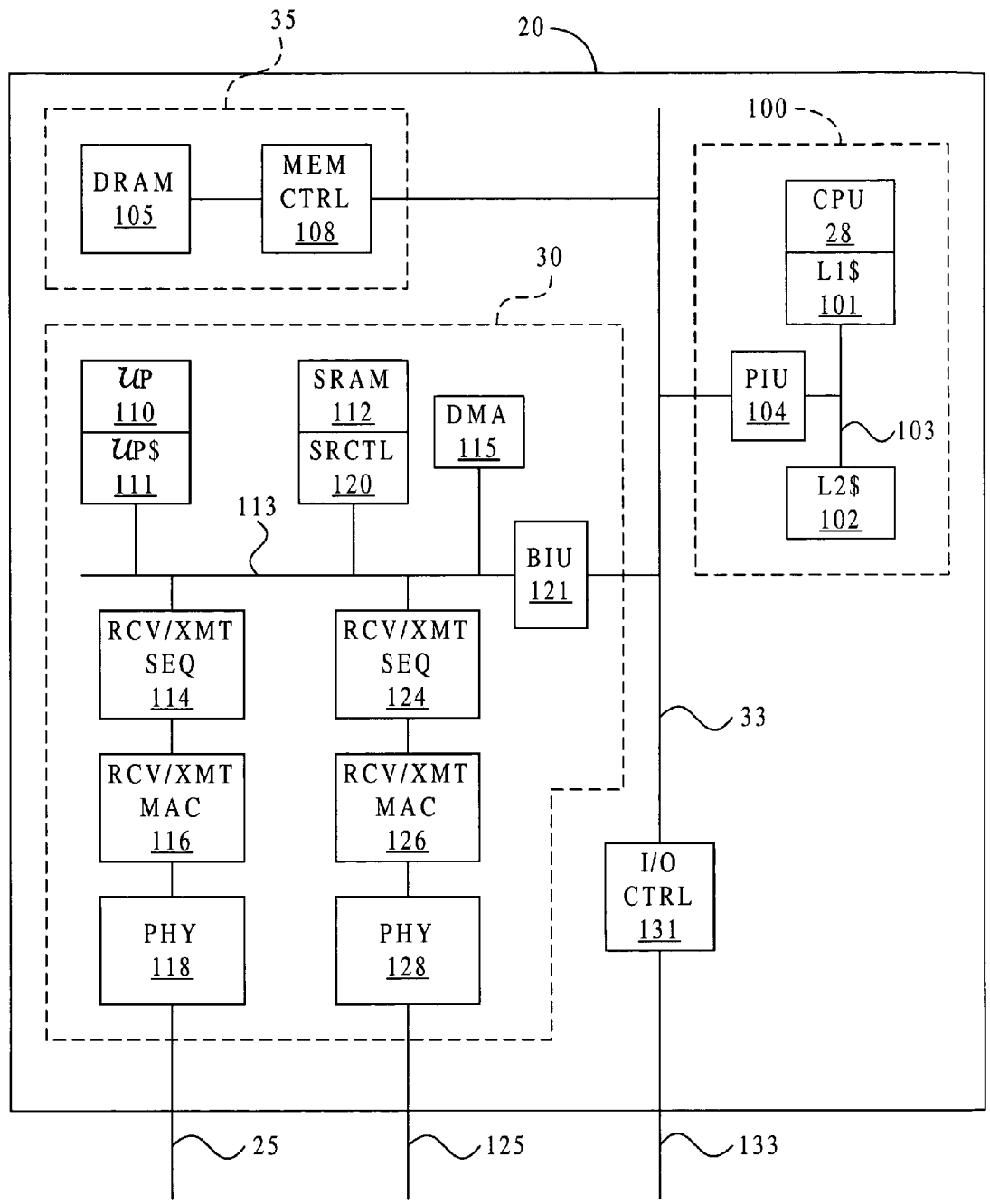
FIG. 4 is a diagram of a first embodiment of the host of FIG. 1 including a CPU, a CPD, and a storage device connected by a host bus.

FIG. 4 shows a view of one embodiment of the host 20, with the CPU 28, the CPD 30 and storage device 35 connected by a host bus 33. The CPU 28 may, for example, be a conventional Pentium® 2, 3 or 4 available from Intel Corporation, 2200 Mission College Blvd., Santa Clara, Calif., 95052. CPU 28 may be integrated with conventional level 1 cache 101 and connected with level 2 cache 102 by a host local bus 103, which is coupled to host bus 33 by a processor interface unit 104, all of which are formed as an integrated circuit 100. Caches 101 and 102 may be composed of static random access memory (SRAM), and more than one such CPU 28 may be included in host 20.

Storage device 35 may include conventional dynamic random access memory (DRAM) 105 and a conventional memory controller 108, which controls writing to and reading from DRAM 105. Although memory 105 is shown in this embodiment as DRAM, many other known forms of data storage may be used, such as SRAM, ferroelectric random access memory (FRAM) or magnetic random access memory (MRAM).

CPD 30 includes a communications microprocessor 110, microprocessor cache 111, SRAM 112, CPD bus 113 and SRAM controller 120. A bus interface unit 121 couples CPD bus 113 and host bus 33. Hardware logic circuits for processing network communication packets include receive and transmit sequencers 114 and 124, receive and transmit media access controllers (MAC) 116 and 126, and physical layer encoder/decoders 118 and 128, respectively. A physical connector, not shown, may couple physical layer encoder/decoder 118 with the network 25, while another physical connector may couple physical layer encoder/decoder 128 with a second network 125. Although only two networks 25 and 125 are shown connected to host 20 in this figure, CPD may have multiple hardware logic paths supporting multiple physical network connections. Details of hardware logic circuits and a microprocessor that may be included in the CPD are available in the applications mentioned above as being incorporated by reference herein.

A conventional input/output (I/O) controller 131 such as a peripheral component interconnect (PCI) bridge may couple host 20 to a PCI or other I/O bus 133, or the memory controller 108 may instead include an I/O controller. For the case in which I/O controller 131 is provided separately, the memory controller 108 may represent a Graphics and AGP Memory controller Hub (GMCH) portion of an Intel 8xx chipset (e.g., i815, i815E, i820 or i820E), while the PCI bridge or controller 131 may represent the I/O Controller Hub (ICH) portion of that 8xx chipset, available from Intel Corporation. For the case in which memory controller 108 contains a PCI bridge, memory controller 108 may represent a Northbridge portion of an Intel 440x chipset, part number 440BX, also available, for example, from Via Technologies, Inc., 1045 Mission Court, Fremont Calif. 94539, as part number VT8501 Apollo MVP4.

Figure 5:
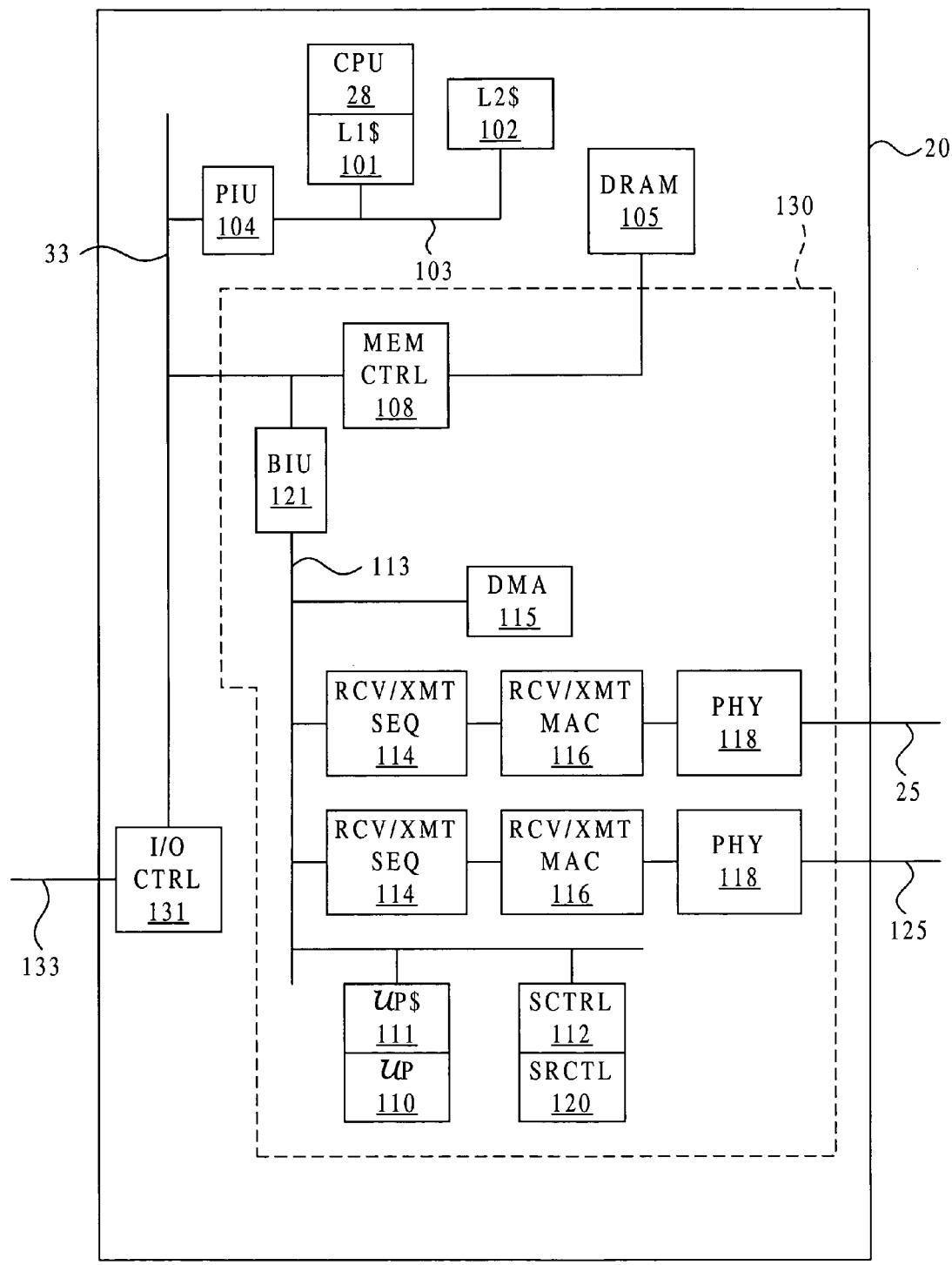
FIG. 5 is a diagram of a second embodiment of the host of FIG. 1 including a CPU, a CPD, and a storage device connected by a host bus.

FIG. 5 shows an embodiment of the host 20 in which the memory controller 108 is integrated with the CPD to form a memory controller and network processor hub 130, for instance on an integrated circuit (IC) chip or printed circuit board (PCB). DRAM 105 may be provided, for example, by plugging into a motherboard slot that connects to the memory controller 108.

Figure 6:
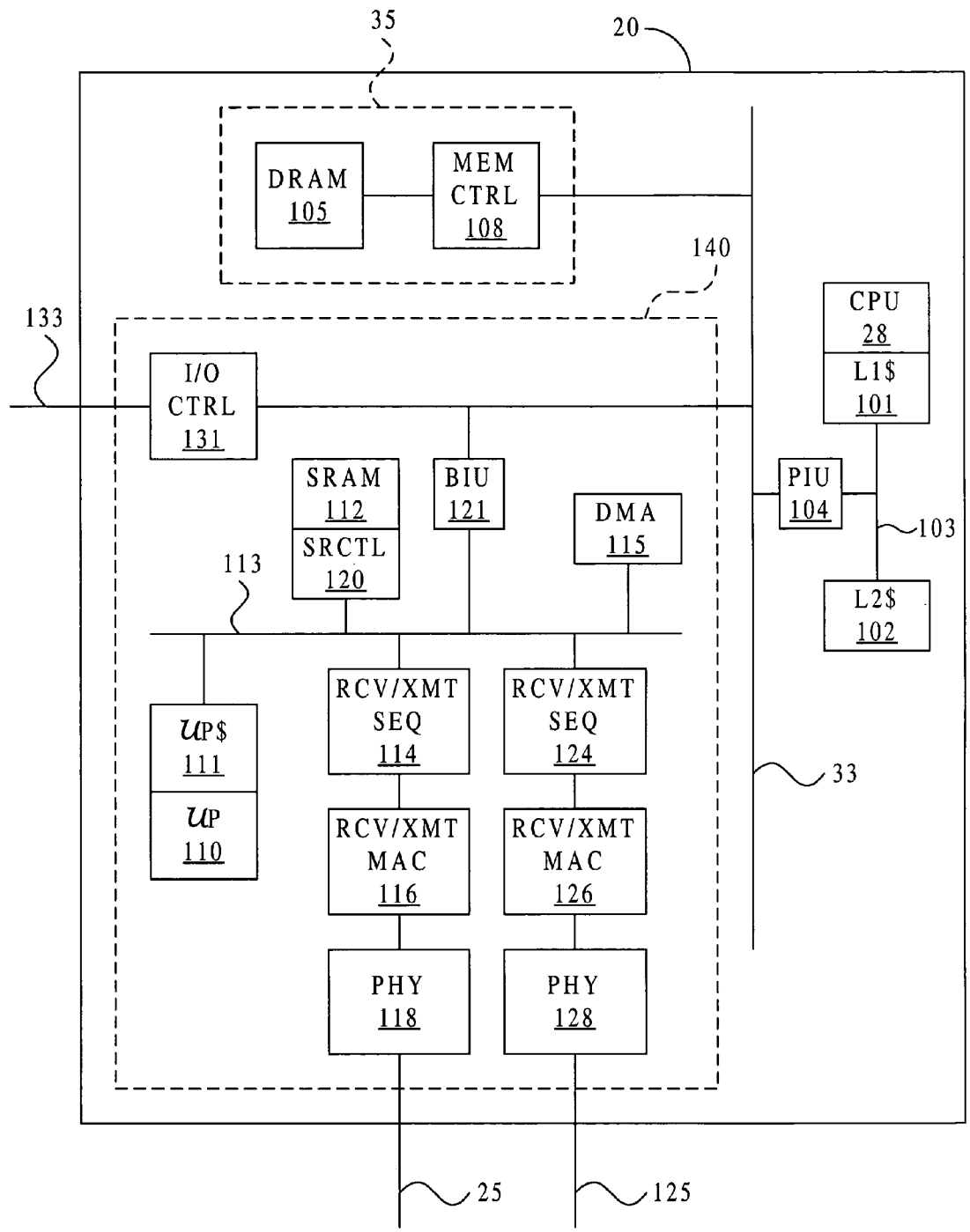
FIG. 6 is a diagram of a third embodiment of the host of FIG. 1 including a CPU, a CPD, and a storage device connected by a host bus.

FIG. 6 shows an embodiment of the host 20 in which the I/O controller 131 is integrated with the CPD to form an I/O controller and network processor hub 140, for instance on an IC or PCB.

Figure 7:
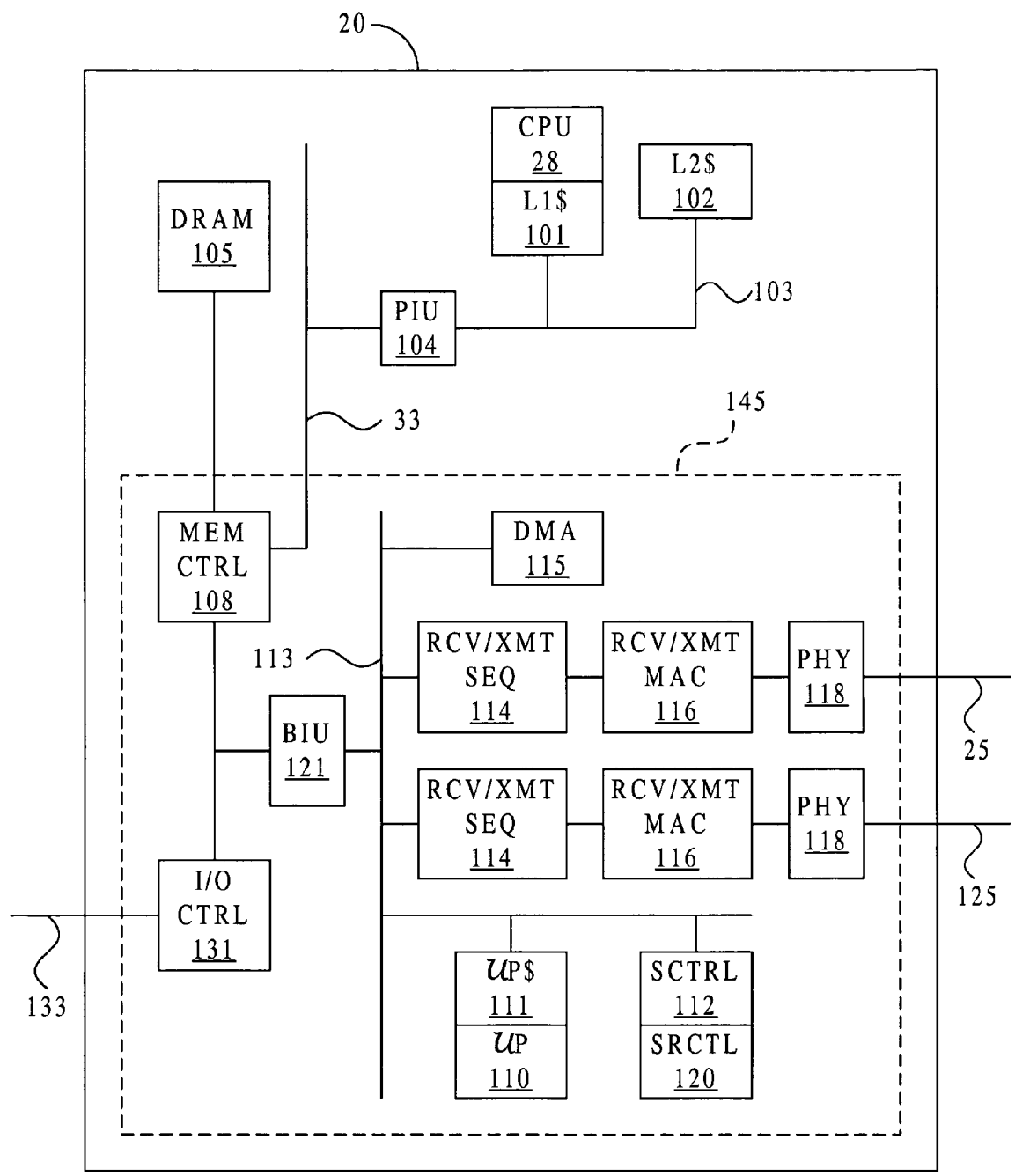
FIG. 7 is a diagram of a fourth embodiment of the host of FIG. 1 including a CPU, a CPD, and a storage device connected by a host bus.

FIG. 7 shows an embodiment of the host 20 in which the I/O controller 131 and memory controller 108 are integrated with the CPD to form a memory controller, I/O controller and network processor hub 145, for instance on an IC or PCB.

Figure 8:
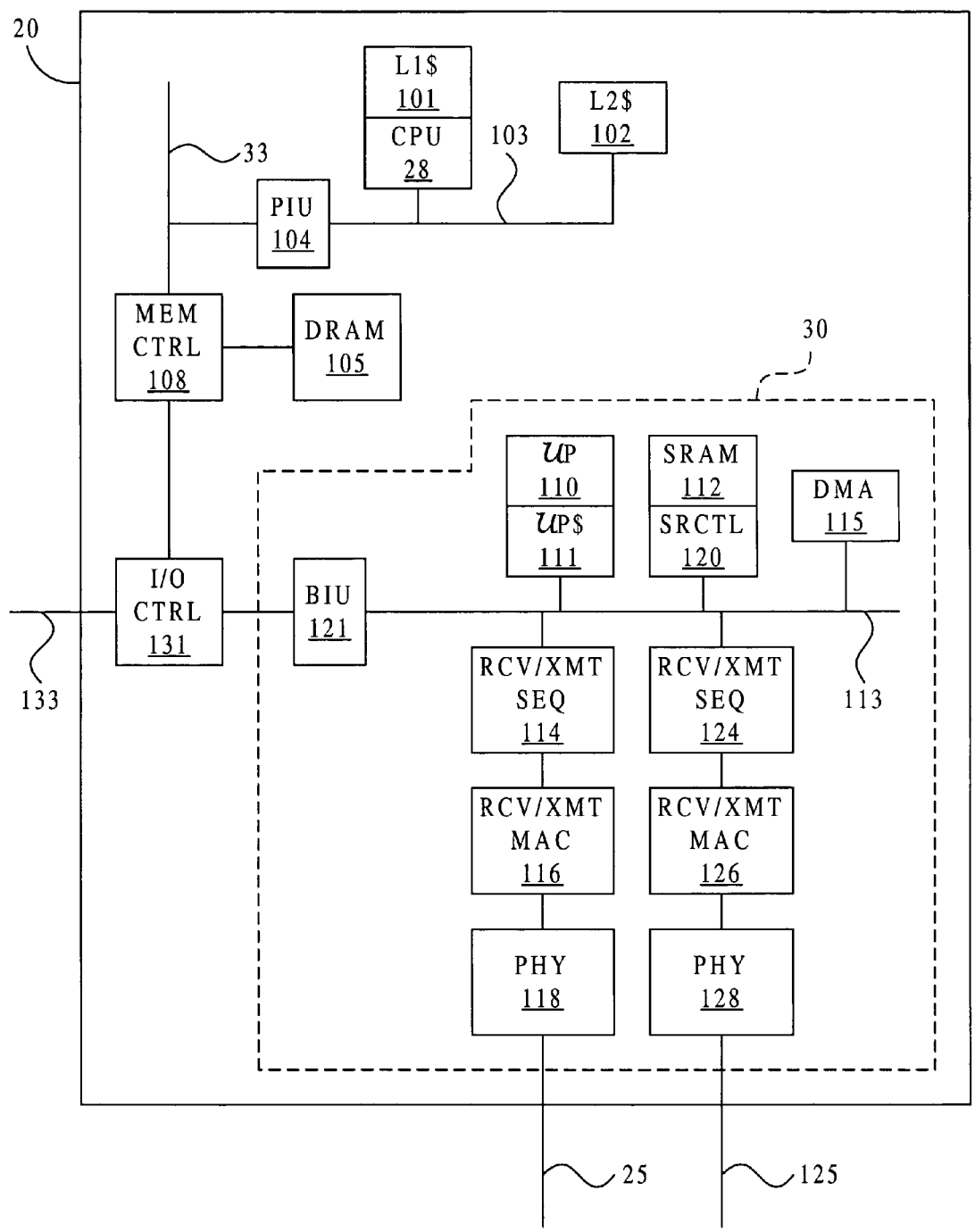
FIG. 8 is a diagram of a fifth embodiment of the host of FIG. 1 including a CPU, a CPD, and a storage device connected by a host bus.

FIG. 8 shows an embodiment of the host 20 in which the CPD 30 is connected to the I/O controller 131, which may for instance be the I/O Controller Hub (ICH) portion of that 8xx chipset (e.g., part number 82801AA ICH or 82801BA ICH2), available from Intel Corporation.

Figure 9:
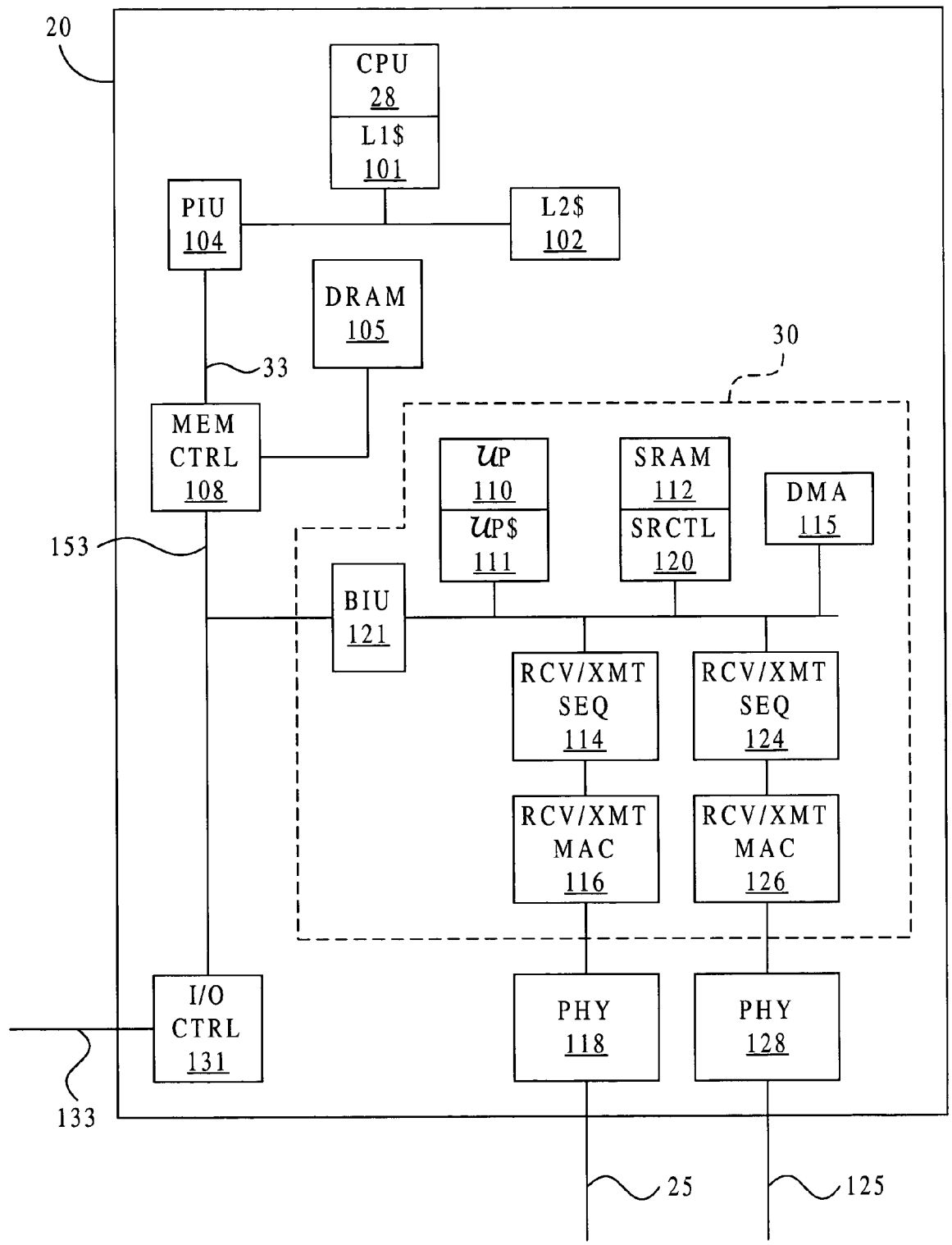
FIG. 9 is a diagram of a sixth embodiment of the host of FIG. 1 including a CPU, a CPD, and a storage device connected by a host bus.

FIG. 9 shows an embodiment of the host 20 in which the CPD 30 is connected to a hub interface bus 153 connecting the memory controller 108 and the I/O controller 131. The memory controller 108 may for example be the Graphics and AGP Memory controller Hub (GMCH) portion of an Intel 8xx chipset (e.g., i815, i815E, i820 or i820E), and the I/O controller 131 may for instance be the I/O Controller Hub (ICH) portion of that 8xx chipset (e.g., part number 82801AA ICH or 82801BA ICH2), available from Intel Corporation.

An advantage of having the CPD 30 integrated into the host 20 occurs when the CPD can access storage 35, such as memory controller 108 and DRAM 105, without using the I/O bus 133. For example, referring again to FIG. 1 and FIGS. 4-10, a logical network connection between host 20 and a remote host 22 may be created by CPU 28 operating a protocol processing stack, the network connection stored as a CCB on DRAM 105. CPD 30 may read the CCB from DRAM 105 and cache the CCB in SRAM 112, also providing a hash table at SRAM 112. A message corresponding to that CCB may then be communicated over network 25 with the assistance of CPD 30 operating a fast-path.

A message corresponding to the CCB and transferred over network 25 from remote host 22 to local host 20, such as a file transferred from computer 22 to computer 20 in response to a read request from host 20 to host 22, is sent as a number of packets that are decoded at PHY 118 and accepted by receive MAC unit 116. The sequencer 114 running receive microcode then processes network and transport layer headers of the packets and checksums the packets, creating a descriptor or summary of each packet that is buffered in SRAM 112 and then written with the packet to DRAM 105 by DMA 115.

An initial packet of the message may contain a session layer header or other information describing the message, and that information may be processed by the CPU running a file system or other management system to obtain a destination for the data from the message (e.g., a portion of DRAM 105 earmarked by the file system for holding all the message data). Once this destination is provided, memory controller 108 moves the data from each message packet, without the headers or descriptors, from the initial storage location in DRAM 105 to the destination, to be used for example by an application. This data movement can be accomplished by either a DMA or remapping of memory blocks on the DRAM 105 by memory controller 108.

Alternatively, after processing by CPD hardware logic of the packets as they arrive from the network, the packets and their corresponding descriptors or summaries may be stored in SRAM 112 or other memory such as DRAM, not shown in this figure, controlled by the CPD. Then, after a message or session layer header has been processed and the destination for the message has been assigned in DRAM 105, DMA units of CPD work with memory controller 108 to move the data from each message packet, without the headers or descriptors, from the original storage location in SRAM 112 to the destination, to be available for example to an application.

The CCB may likewise be cached in SRAM 112 or other memory such as DRAM controlled by the CPD, as well as in DRAM 105. With the CCB stored in DRAM 105, either the communication microprocessor 110 or CPU 28 can access the CCB. For example, after creation of the CCB by CPU 28 running the protocol stack 44, the stack can issue a command to the CPD 30 to take ownership of the CCB, accompanied by a list of addresses in DRAM 105 of where the CCB is stored. A response by the CPD accepting control of the CCB accomplishes the ownership change, and the CPD may then access the CCB as needed. The CCB may contain an ownership bit that designates whether the CPU 28 or CPD 30 controls the CCB. Other mechanisms of allocating control of the CCB stored in DRAM 105 are also possible.

Alternatively, the CCB can be copied from DRAM 105 into SRAM 112 or other memory such as DRAM controlled by the CPD 30. With CCB cached in SRAM 112, each received packet corresponding to the CCB can be stored, along with its descriptor, in DRAM 105 directly after processing by the CPD hardware logic. For the case in which a destination for the message being received has already been allocated, for example by processing a session layer header for the message, data from the received packet can be stored in the destination in DRAM 105 directly after processing by the CPD hardware logic. Instead of caching a complete CCB in SRAM 112, selected cache lines of the CCB may be cached in microprocessor cache 111 by a cache manager run by communication microprocessor 110, and controlling DMA 115.

In one embodiment, the communication microprocessor 110 can create a CCB by processing connection initiation communications for selected fast-path protocols, such as TCP/IP, by running a protocol stack stored in SRAM 112 or other memory such as DRAM controlled by the CPD 30, with the CPU 28 available for processing other protocols. In this case, a source or destination for a message corresponding to the CCB can be provided by the host file system, by respectively creating or analyzing information from a session layer or other header for the message.

Figure 10:
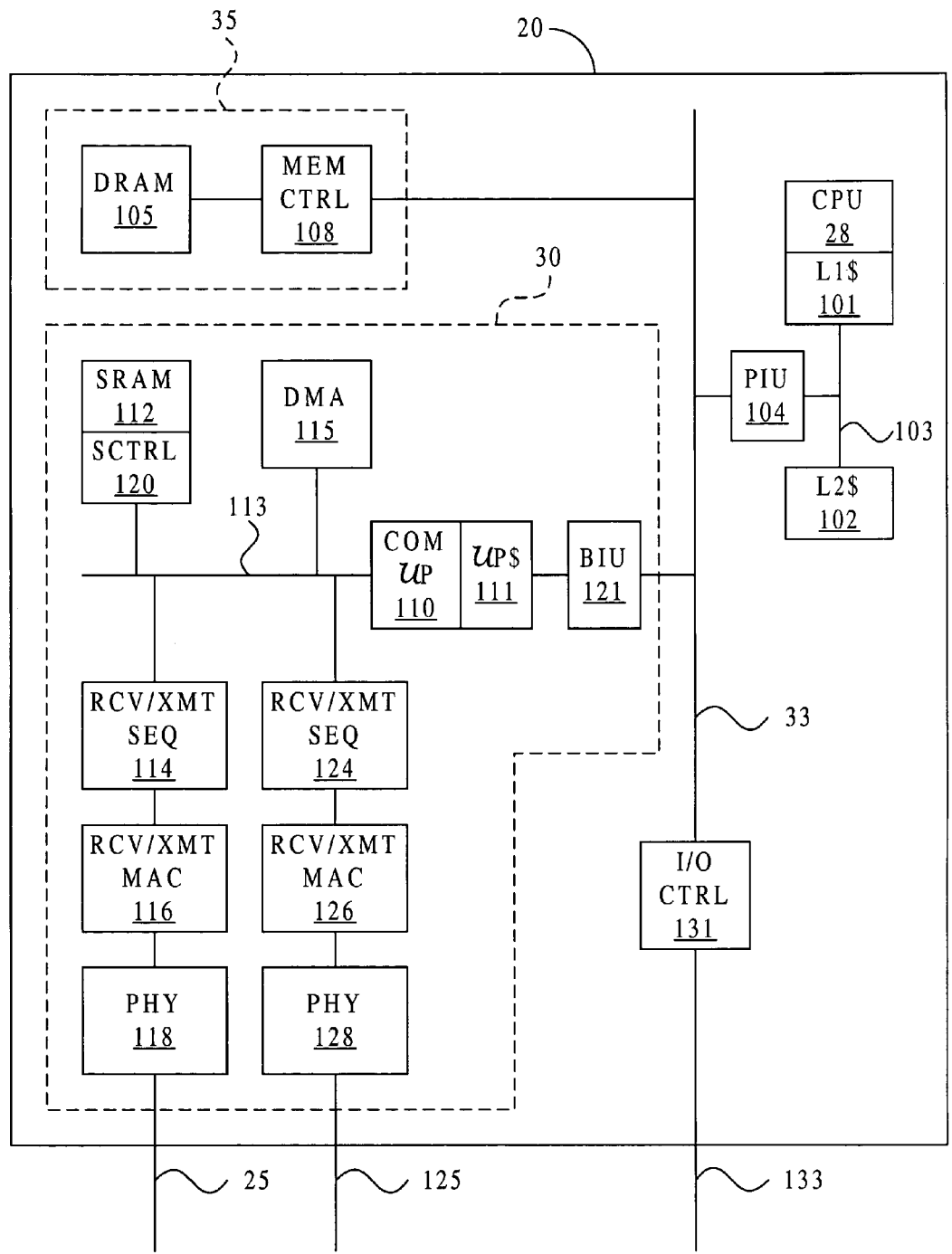
FIG. 10 is a diagram of a seventh embodiment of the host of FIG. 1 including a CPU, a CPD, and a storage device connected by a host bus.

FIG. 10 shows an embodiment similar to that shown in FIG. 4, but with the communication microprocessor 110 directly coupled to host bus 33 via the bus interface unit 121. The communication microprocessor 110 in the embodiments illustrated in FIGS. 5-9 can also be placed on the host bus in those embodiments. Locating the communication microprocessor 110 on the host bus in this fashion allows the communication microprocessor 110 to directly access CCBs stored in DRAM 105, rather than directing DMA controllers to perform that function. Further, conventional processors such as an Intel i960 may be employed for communication microprocessor 110 in the embodiments for which the communication microprocessor 110 is disposed on host bus 33.

Figure 11A:
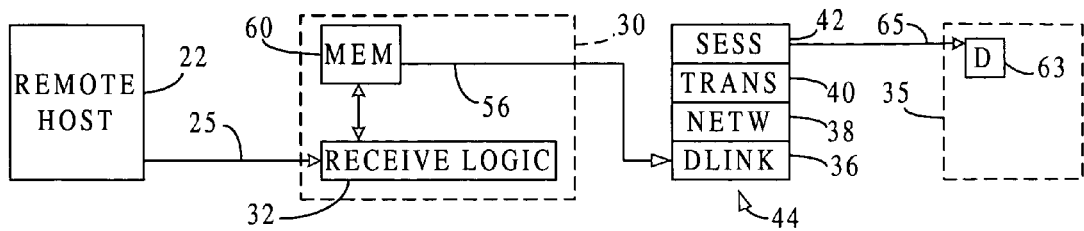
FIG. 11A is a diagram of information flow for the host of FIG. 1 receiving a message packet processed by the slow-path.

As shown more specifically in FIG. 11A, when a message packet is received from the remote host 22 via network 25, the packet enters hardware receive logic 32 of the CPD 30, which checksums headers and data, and parses the headers, creating a word or words which identify the message packet and status, storing the headers, data and word temporarily in memory 60. As well as validating the packet, the receive logic 32 indicates with the word whether this packet is a candidate for fast-path processing. FIG. 11A depicts the case in which the packet is not a fast-path candidate, in which case the CPD 30 sends the validated headers and data from memory 60 to data link layer 36 along an internal bus for processing by the host CPU, as shown by arrow 56. The packet is processed by the host protocol stack 44 of data link 36, network 38, transport 40 and session 42 layers, and data (D) 63 from the packet may then be sent to storage 35, as shown by arrow 65.

Figure 11B:
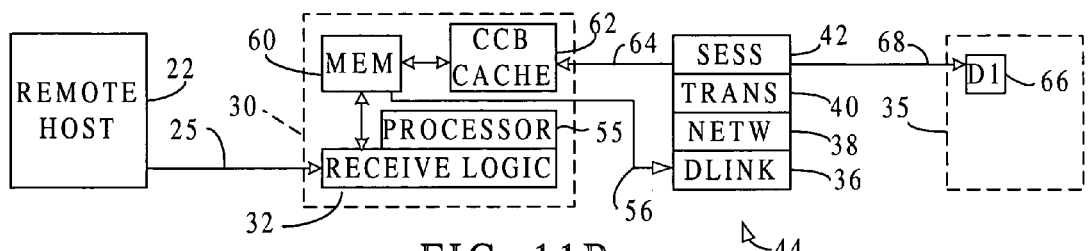
FIG. 11B is a diagram of information flow for the host of FIG. 1 receiving an initial message packet processed by the fast-path.

FIG. 11B, depicts the case in which the receive logic 32 of the CPD determines that a message packet is a candidate for fast-path processing, for example by deriving from the packet's headers that the packet belongs to a TCP/IP, TTCP/IP or SPX/IPX message. A processor 55 in the CPD 30 then checks to see whether the word that summarizes the fast-path candidate matches a CCB held in a cache 62. Upon finding no match for this packet, the CPD sends the validated packet from memory 60 to the host protocol stack 44 for processing. Host stack 44 may use this packet to create a connection context for the message, including finding and reserving a destination for data from the message associated with the packet, the context taking the form of a CCB. The present embodiment employs a single specialized host stack 44 for processing both fast-path and non-fast-path candidates, while in an embodiment described below fast-path candidates are processed by a different host stack than non-fast-path candidates. Some data (D1) 66 from that initial packet may optionally be sent to the destination in storage 35, as shown by arrow 68. The CCB is then sent to the CPD 30 to be saved in cache 62, as shown by arrow 64. For a traditional connection-based message such as typified by TCP/IP, the initial packet may be part of a connection initialization dialogue that transpires between hosts before the CCB is created and passed to the CPD 30.

Figure 11C:
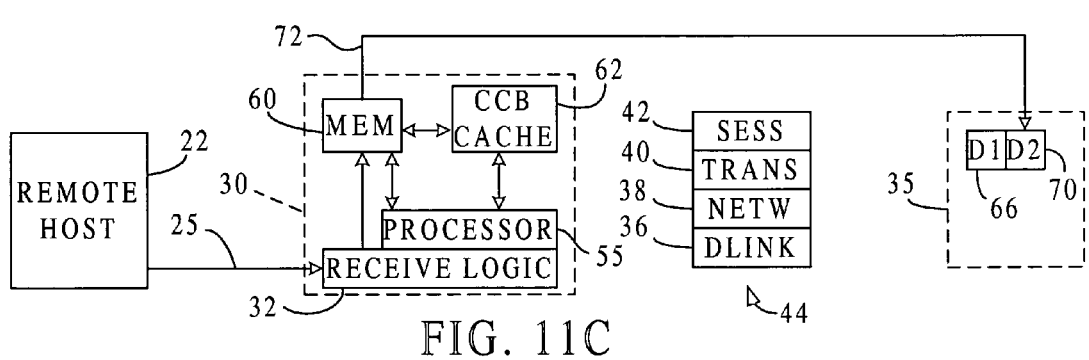
FIG. 11C is a diagram of information flow for the host of FIG. 4B receiving a subsequent message packet processed by the fast-path.

Referring now to FIG. 11C, when a subsequent packet from the same connection as the initial packet is received from the network 25 by CPD 30, the packet headers and data are validated by the receive logic 32, and the headers are parsed to create a summary of the message packet and a hash for finding a corresponding CCB, the summary and hash contained in a word or words. The word or words are temporarily stored in memory 60 along with the packet. The processor 55 checks for a match between the hash and each CCB that is stored in the cache 62 and, finding a match, sends the data (D2) 70 via a fast-path directly to the destination in storage 35, as shown by arrow 72, bypassing the session layer 42, transport layer 40, network layer 38 and data link layer 36. The remaining data packets from the message can also be sent by DMA directly to storage, avoiding the relatively slow protocol layer processing and repeated copying by the CPU stack 44.

Figure 11D:
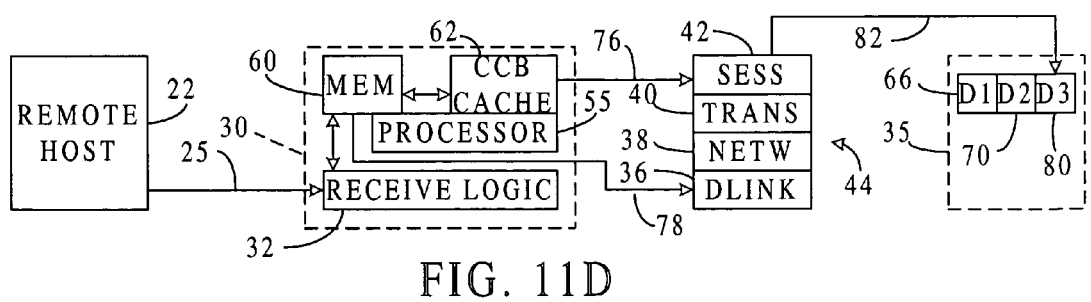
FIG. 11D is a diagram of information flow for the host of FIG. 4C receiving a message packet having an error that causes processing to revert to the slow-path.

FIG. 11D shows the procedure for handling the rare instance when a message for which a fast-path connection has been established, such as shown in FIG. 11C, has a packet that is not easily handled by the CPD. In this case the packet is sent to be processed by the protocol stack 44, which is handed the CCB for that message from cache 62 via a control dialogue with the CPD, as shown by arrow 76, signaling to the CPU to take over processing of that message. Slow-path processing by the protocol stack then results in data (D3) 80 from the packet being sent, as shown by arrow 82, to storage 35. Once the packet has been processed and the error situation corrected, the CCB can be handed back via a control dialogue to the cache 62, so that payload data from subsequent packets of that message can again be sent via the fast-path of the CPD 30. Thus the CPU and CPD together decide whether a given message is to be processed according to fast-path hardware processing or more conventional software processing by the CPU.

Figure 12:
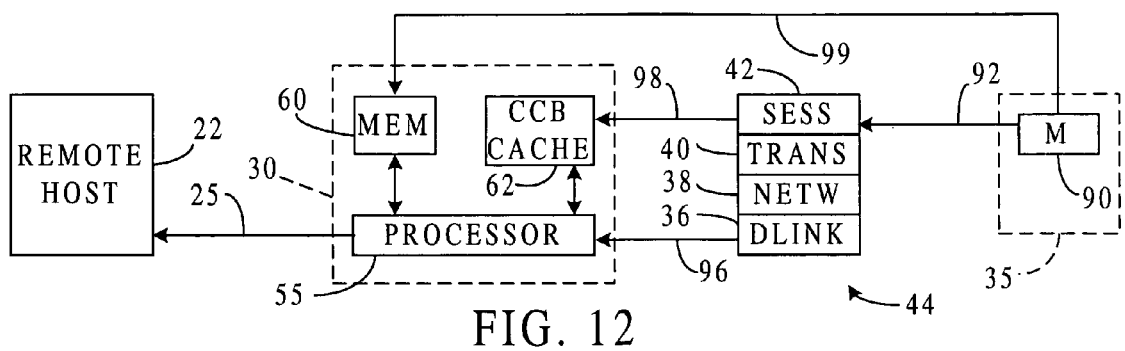
FIG. 12 is a diagram of information flow for the host of FIG. 1 transmitting a message by either the fast or slow-paths.
Figure 13:
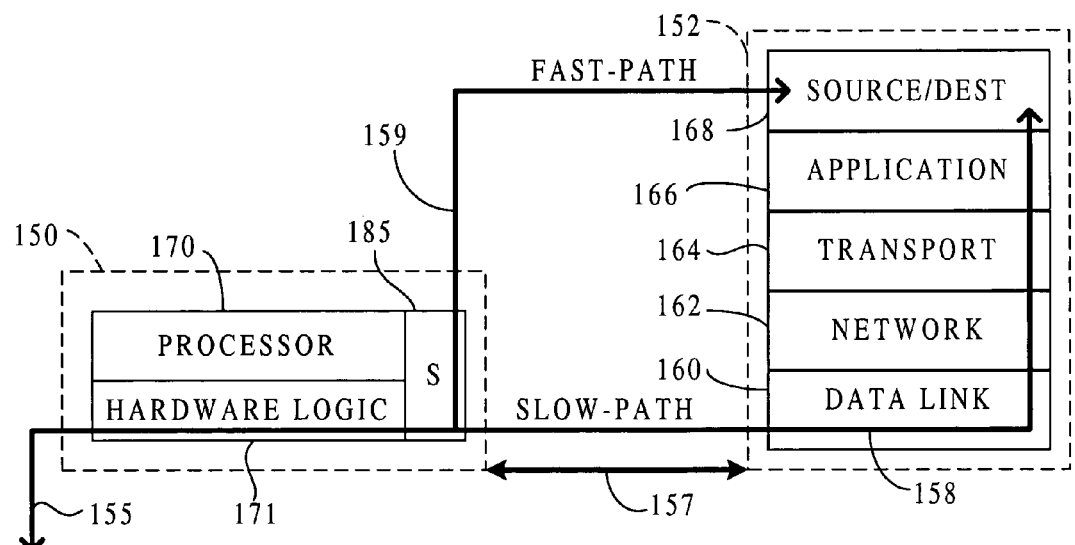
FIG. 13 is a diagram of information flow for a first embodiment of an intelligent network interface card (INIC) associated with a client having a TCP/IP processing stack.

Transmission of a message from the host 20 to the network 25 for delivery to remote host 22 also can be processed by either sequential protocol software processing via the CPU or accelerated hardware processing via the CPD 30, as shown in FIG. 12. A message (M) 90 that is selected by CPU 28 from storage 35 can be sent to session layer 42 for processing by stack 44, as shown by arrows 92 and 96. For the situation in which a connection exists and the CPD 30 already has an appropriate CCB for the message, however, data packets can bypass host stack 44 and be sent by DMA directly to memory 60, with the processor 55 adding to each data packet a single header containing all the appropriate protocol layers, and sending the resulting packets to the network 25 for transmission to remote host 22. This fast-path transmission can greatly accelerate processing for even a single packet, with the acceleration multiplied for a larger message.

A message for which a fast-path connection is not extant thus may benefit from creation of a CCB with appropriate control and state information for guiding fast-path transmission. For a traditional connection-based message, such as typified by TCP/IP or SPX/IPX, the CCB is created during connection initialization dialogue. For a quick-connection message, such as typified by TTCP/IP, the CCB can be created with the same transaction that transmits payload data. In this case, the transmission of payload data may be a reply to a request that was used to set up the fast-path connection. In any case, the CCB provides protocol and status information regarding each of the protocol layers, including which user is involved and storage space for per-transfer information. The CCB is created by protocol stack 44, which then passes the CCB to the CPD 30 by writing to a command register of the CPD, as shown by arrow 98. Guided by the CCB, the processor 55 moves network frame-sized portions of the data from the source in host memory 35 into its own memory 60 using DMA, as depicted by arrow 99. The processor 55 then prepends appropriate headers and checksums to the data portions, and transmits the resulting frames to the network 25, consistent with the restrictions of the associated protocols. After the CPD 30 has received an acknowledgement that all the data has reached its destination, the CPD will then notify the host 35 by writing to a response buffer.

Thus, fast-path transmission of data communications also relieves the host CPU of per-frame processing. A vast majority of data transmissions can be sent to the network by the fast-path. Both the input and output fast-paths attain a huge reduction in interrupts by functioning at an upper layer level, i.e., session level or higher, and interactions between the network microprocessor and the host occur using the full transfer sizes which that upper layer wishes to make. For fast-path communications, an interrupt only occurs (at the most) at the beginning and end of an entire upper-layer message transaction, and there are no interrupts for the sending or receiving of each lower layer portion or packet of that transaction.

A simplified intelligent network interface card (INIC) 150 is shown in FIG. 12 to provide a network interface for a host 152. Hardware logic 171 of the INIC 150 is connected to a network 155, with a peripheral bus (PCI) 157 connecting the INIC and host. The host 152 in this embodiment has a TCP/IP protocol stack, which provides a slow-path 158 for sequential software processing of message frames received from the network 155. The host 152 protocol stack includes a data link layer 160, network layer 162, a transport layer 164 and an application layer 166, which provides a source or destination 168 for the communication data in the host 152. Other layers which are not shown, such as session and presentation layers, may also be included in the host stack 152, and the source or destination may vary depending upon the nature of the data and may actually be the application layer.

The INIC 150 has a network processor 170 which chooses between processing messages along a slow-path 158 that includes the protocol stack of the host, or along a fast-path 159 that bypasses the protocol stack of the host. Each received packet is processed on the fly by hardware logic 171 contained in INIC 150, so that all of the protocol headers for a packet can be processed without copying, moving or storing the data between protocol layers. The hardware logic 171 processes the headers of a given packet at one time as packet bytes pass through the hardware, by categorizing selected header bytes. Results of processing the selected bytes help to determine which other bytes of the packet are categorized, until a summary of the packet has been created, including checksum validations. The processed headers and data from the received packet are then stored in INIC storage 185, as well as the word or words summarizing the headers and status of the packet.

Figure 14:
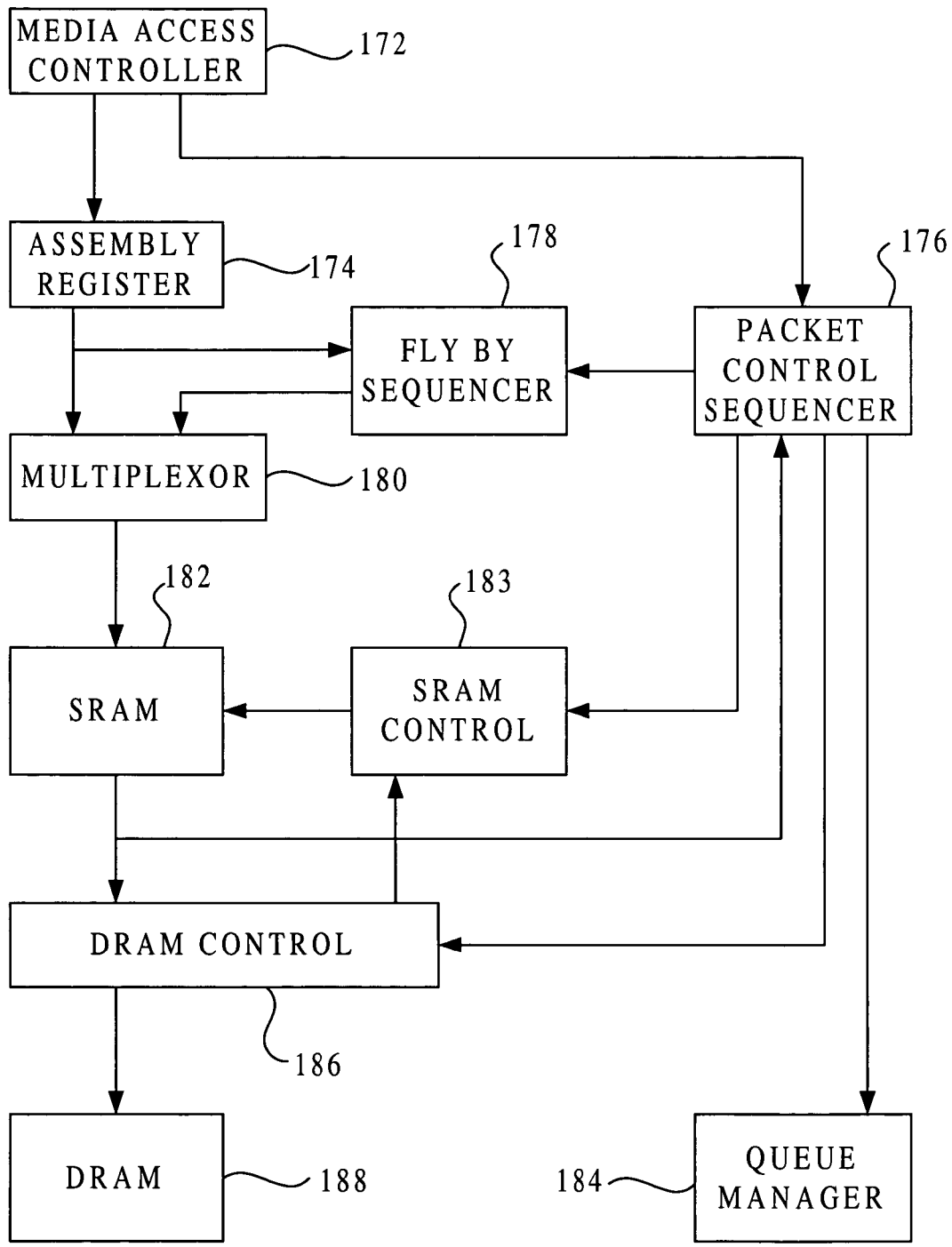
FIG. 14 is a diagram of hardware logic for the INIC embodiment shown in FIG. 13, including a packet control sequencer and a fly-by sequencer.

The hardware processing of message packets received by INIC 150 from network 155 is shown in more detail in FIG. 14. A received message packet first enters a media access controller 172, which controls INIC access to the network and receipt of packets and can provide statistical information for network protocol management. From there, data flows one byte at a time into an assembly register 174, which in this example is 128 bits wide. The data is categorized by a fly-by sequencer 178, as will be explained in more detail with regard to FIG. 15, which examines the bytes of a packet as they fly by, and generates status from those bytes that will be used to summarize the packet. The status thus created is merged with the data by a multiplexor 180 and the resulting data stored in SRAM 182. A packet control sequencer 176 oversees the fly-by sequencer 178, examines information from the media access controller 172, counts the bytes of data, generates addresses, moves status and manages the movement of data from the assembly register 174 to SRAM 182 and eventually DRAM 188. The packet control sequencer 176 manages a buffer in SRAM 182 via SRAM controller 183, and also indicates to a DRAM controller 186 when data needs to be moved from SRAM 182 to a buffer in DRAM 188. Once data movement for the packet has been completed and all the data has been moved to the buffer in DRAM 188, the packet control sequencer 176 will move the status that has been generated in the fly-by sequencer 178 out to the SRAM 182 and to the beginning of the DRAM 188 buffer to be prepended to the packet data. The packet control sequencer 176 then requests a queue manager 184 to enter a receive buffer descriptor into a receive queue, which in turn notifies the processor 170 that the packet has been processed by hardware logic 171 and its status summarized.

Figure 15:
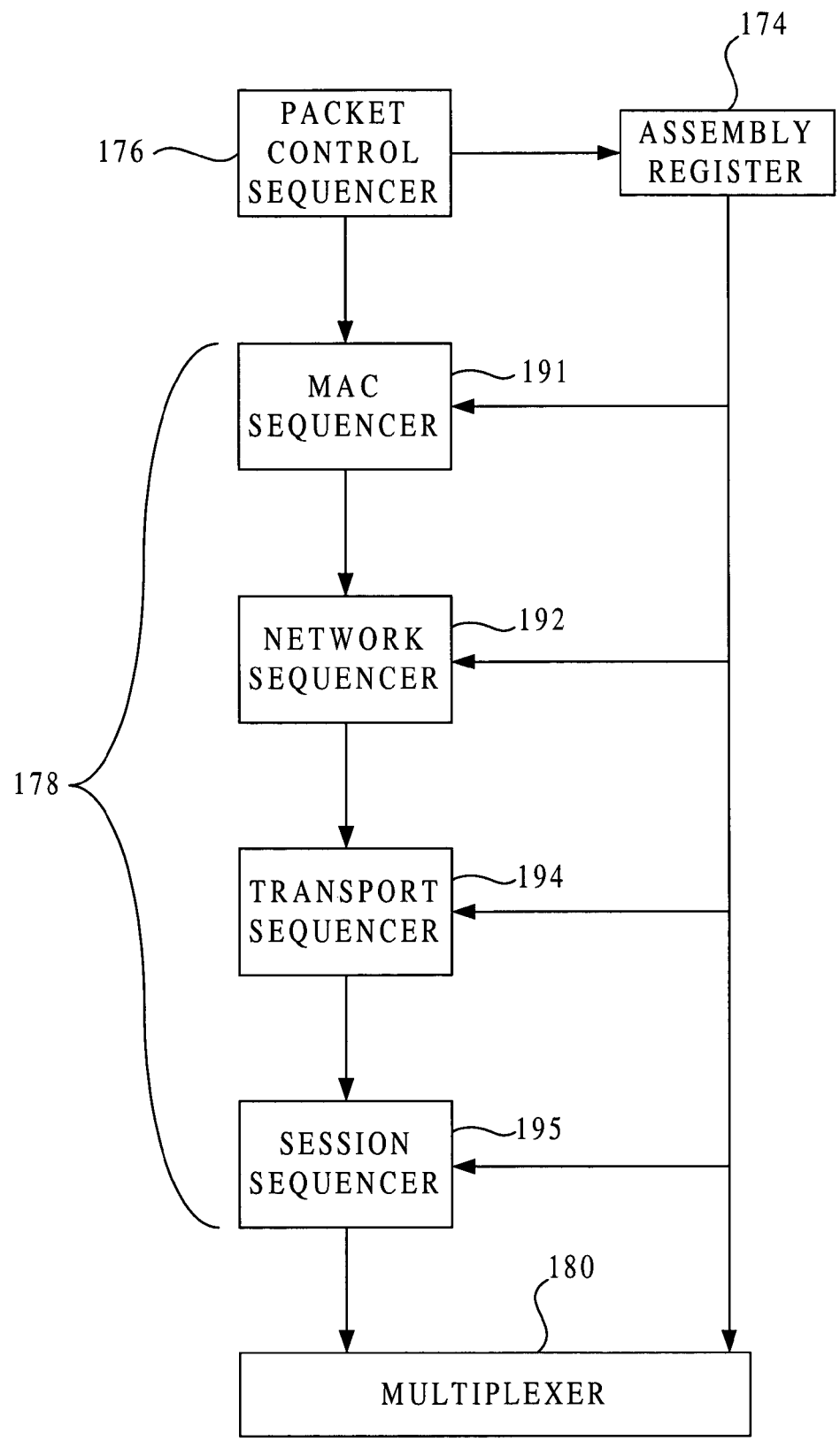
FIG. 15 is a diagram of the fly-by sequencer of FIG. 14 for analyzing header bytes as they are received by the INIC.

FIG. 15 shows that the fly-by sequencer 178 has several tiers, with each tier generally focusing on a particular portion of the packet header and thus on a particular protocol layer, for generating status pertaining to that layer. The fly-by sequencer 178 in this embodiment includes a media access control sequencer 191, a network sequencer 192, a transport sequencer 194 and a session sequencer 195. Sequencers pertaining to higher protocol layers can additionally be provided. The fly-by sequencer 178 is reset by the packet control sequencer 176 and given pointers by the packet control sequencer that tell the fly-by sequencer whether a given byte is available from the assembly register 174. The media access control sequencer 191 determines, by looking at bytes 0-5, that a packet is addressed to host 152 rather than or in addition to another host. Offsets 12 and 13 of the packet are also processed by the media access control sequencer 191 to determine the type field, for example whether the packet is Ethernet or 802.3. If the type field is Ethernet those bytes also tell the media access control sequencer 191 the packet's network protocol type. For the 802.3 case, those bytes instead indicate the length of the entire frame, and the media access control sequencer 191 will check eight bytes further into the packet to determine the network layer type.

For most packets the network sequencer 192 validates that the header length received has the correct length, and checksums the network layer header. For fast-path candidates the network layer header is known to be IP or IPX from analysis done by the media access control sequencer 191. Assuming for example that the type field is 802.3 and the network protocol is IP, the network sequencer 192 analyzes the first bytes of the network layer header, which will begin at byte 22, in order to determine IP type. The first bytes of the IP header will be processed by the network sequencer 192 to determine what IP type the packet involves. Determining that the packet involves, for example, IP version 4, directs further processing by the network sequencer 192, which also looks at the protocol type located ten bytes into the IP header for an indication of the transport header protocol of the packet. For example, for IP over Ethernet, the IP header begins at offset 14, and the protocol type byte is offset 23, which will be processed by network logic to determine whether the transport layer protocol is TCP, for example. From the length of the network layer header, which is typically 20-40 bytes, network sequencer 192 determines the beginning of the packet's transport layer header for validating the transport layer header. Transport sequencer 194 may generate checksums for the transport layer header and data, which may include information from the IP header in the case of TCP at least.

Continuing with the example of a TCP packet, transport sequencer 194 also analyzes the first few bytes in the transport layer portion of the header to determine, in part, the TCP source and destination ports for the message, such as whether the packet is NetBios or other protocols. Byte 12 of the TCP header is processed by the transport sequencer 194 to determine and validate the TCP header length. Byte 13 of the TCP header contains flags that may, aside from ack flags and push flags, indicate unexpected options, such as reset and fin, that may cause the processor to categorize this packet as an exception. TCP offset bytes 16 and 17 are the checksum, which is pulled out and stored by the hardware logic 171 while the rest of the frame is validated against the checksum.

Session sequencer 195 determines the length of the session layer header, which in the case of NetBios is only four bytes, two of which tell the length of the NetBios payload data, but which can be much larger for other protocols. The session sequencer 195 can also be used to categorize the type of message as read or write, for example, for which the fast-path may be particularly beneficial. Further upper layer logic processing, depending upon the message type, can be performed by the hardware logic 171 of packet control sequencer 176 and fly-by sequencer 178. Thus hardware logic 171 intelligently directs hardware processing of the headers by categorization of selected bytes from a single stream of bytes, with the status of the packet being built from classifications determined on the fly. Once the packet control sequencer 176 detects that all of the packet has been processed by the fly-by sequencer 178, the packet control sequencer 176 adds the status information generated by the fly-by sequencer 178 and any status information generated by the packet control sequencer 176, and prepends (adds to the front) that status information to the packet, for convenience in handling the packet by the processor 170. The additional status information generated by the packet control sequencer 176 includes media access controller 172 status information and any errors discovered, or data overflow in either the assembly register or DRAM buffer, or other miscellaneous information regarding the packet. The packet control sequencer 176 also stores entries into a receive buffer queue and a receive statistics queue via the queue manager 184.

An advantage of processing a packet by hardware logic 171 is that the packet does not, in contrast with conventional sequential software protocol processing, have to be stored, moved, copied or pulled from storage for processing each protocol layer header, offering dramatic increases in processing efficiency and savings in processing time for each packet. The packets can be processed at the rate bits are received from the network, for example 100 megabits/second for a 100 baseT connection. The time for categorizing a packet received at this rate and having a length of sixty bytes is thus about 5 microseconds. The total time for processing this packet with the hardware logic 171 and sending packet data to its host destination via the fast-path may be about 16 microseconds or less, assuming a 66 MH PCI bus, whereas conventional software protocol processing by a 300 MH Pentium II® processor may take as much as 200 microseconds in a busy system. More than an order of magnitude decrease in processing time can thus be achieved with fast-path 159 in comparison with a high-speed CPU employing conventional sequential software protocol processing, demonstrating the dramatic acceleration provided by processing the protocol headers by the hardware logic 171 and processor 170, without even considering the additional time savings afforded by the reduction in CPU interrupts and host bus bandwidth savings.

The processor 170 chooses, for each received message packet held in storage 185, whether that packet is a candidate for the fast-path 159 and, if so, checks to see whether a fast-path has already been set up for the connection that the packet belongs to. To do this, the processor 170 first checks the header status summary to determine whether the packet headers are of a protocol defined for fast-path candidates. If not, the processor 170 commands DMA controllers in the INIC 150 to send the packet to the host for slow-path 158 processing. Even for a slow-path 158 processing of a message, the INIC 150 thus performs initial procedures such as validation and determination of message type, and passes the validated message at least to the data link layer 160 of the host.

For fast-path 159 candidates, the processor 170 checks to see whether the header status summary matches a CCB held by the INIC. If so, the data from the packet is sent along fast-path 159 to the destination 168 in the host. If the fast-path 159 candidate's packet summary does not match a CCB held by the INIC, the packet may be sent to the host 152 for slow-path processing to create a CCB for the message. Employment of the fast-path 159 may also not be needed or desirable for the case of fragmented messages or other complexities. For the vast majority of messages, however, the INIC fast-path 159 can greatly accelerate message processing. The INIC 150 thus provides a single state machine processor 170 that decides whether to send data directly to its destination, based upon information gleaned on the fly, as opposed to the conventional employment of a state machine in each of several protocol layers for determining the destiny of a given packet.

In processing an indication or packet received at the host 152, a protocol driver of the host selects the processing route based upon whether the indication is fast-path or slow-path. A TCP/IP or SPX/IPX message has a connection that is set up from which a CCB is formed by the driver and passed to the INIC for matching with and guiding the fast-path packet to the connection destination 168. For a TTCP/IP message, the driver can create a connection context for the transaction from processing an initial request packet, including locating the message destination 168, and then passing that context to the INIC in the form of a CCB for providing a fast-path for a reply from that destination. A CCB includes connection and state information regarding the protocol layers and packets of the message. Thus a CCB can include source and destination media access control (MAC) addresses, source and destination IP or IPX addresses, source and destination TCP or SPX ports, TCP variables such as timers, receive and transmit windows for sliding window protocols, and information denoting the session layer protocol.

Caching the CCBs in a hash table in the INIC provides quick comparisons with words summarizing incoming packets to determine whether the packets can be processed via the fast-path 159, while the full CCBs are also held in the INIC for processing. Other ways to accelerate this comparison include software processes such as a B-tree or hardware assists such as a content addressable memory (CAM). When INIC microcode or comparitor circuits detect a match with the CCB, a DMA controller places the data from the packet in the destination 168, without any interrupt by the CPU, protocol processing or copying. Depending upon the type of message received, the destination of the data may be the session, presentation or application layers, or a file buffer cache in the host 152.

Figure 16:
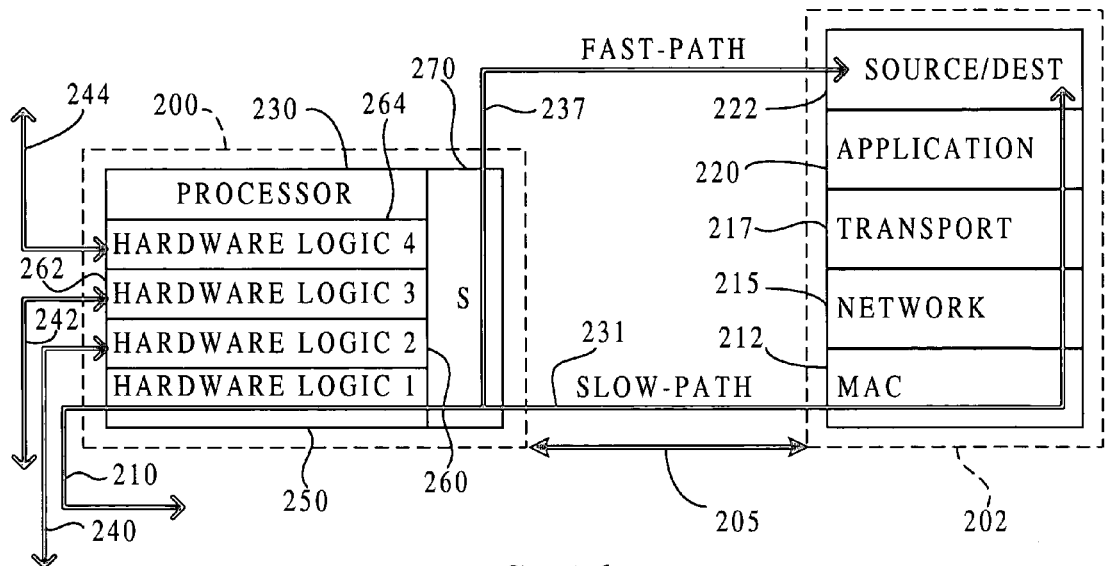
FIG. 16 is a diagram of information flow for a second embodiment of an INIC associated with a server having a TCP/IP processing stack.

FIG. 16 shows an INIC 200 connected to a host 202 that is employed as a file server. This INIC provides a network interface for several network connections employing the 802.3u standard, commonly known as Fast Ethernet. The INIC 200 is connected by a PCI bus 205 to the server 202, which maintains a TCP/IP or SPX/IPX protocol stack including MAC layer 212, network layer 215, transport layer 217 and application layer 220, with a source/destination 222 shown above the application layer, although as mentioned earlier the application layer can be the source or destination. The INIC is also connected to network lines 210, 240, 242 and 244, which are preferably fast Ethernet, twisted pair, fiber optic, coaxial cable or other lines each allowing data transmission of 100 Mb/s, while faster and slower data rates are also possible. Network lines 210, 240, 242 and 244 are each connected to a dedicated row of hardware circuits which can each validate and summarize message packets received from their respective network line. Thus line 210 is connected with a first horizontal row of sequencers 250, line 240 is connected with a second horizontal row of sequencers 260, line 242 is connected with a third horizontal row of sequencers 262 and line 244 is connected with a fourth horizontal row of sequencers 264. After a packet has been validated and summarized by one of the horizontal hardware rows it is stored along with its status summary in storage 270.

A network processor 230 determines, based on that summary and a comparison with any CCBs stored in the INIC 200, whether to send a packet along a slow-path 231 for processing by the host. A large majority of packets can avoid such sequential processing and have their data portions sent by DMA along a fast-path 237 directly to the data destination 222 in the server according to a matching CCB. Similarly, the fast-path 237 provides an avenue to send data directly from the source 222 to any of the network lines by processor 230 division of the data into packets and addition of full headers for network transmission, again minimizing CPU processing and interrupts. For clarity only horizontal sequencer 250 is shown active; in actuality each of the sequencer rows 250, 260, 262 and 264 offers full duplex communication, concurrently with all other sequencer rows. The specialized INIC 200 is much faster at working with message packets than even advanced general-purpose host CPUs that processes those headers sequentially according to the software protocol stack.

One of the most commonly used network protocols for large messages such as file transfers is server message block (SMB) over TCP/IP. SMB can operate in conjunction with redirector software that determines whether a required resource for a particular operation, such as a printer or a disk upon which a file is to be written, resides in or is associated with the host from which the operation was generated or is located at another host connected to the network, such as a file server. SMB and server/redirector are conventionally serviced by the transport layer; in the present invention SMB and redirector can instead be serviced by the INIC. In this case, sending data by the DMA controllers from the INIC buffers when receiving a large SMB transaction may greatly reduce interrupts that the host must handle. Moreover, this DMA generally moves the data to its final destination in the file system cache. An SMB transmission of the present invention follows essentially the reverse of the above described SMB receive, with data transferred from the host to the INIC and stored in buffers, while the associated protocol headers are prepended to the data in the IMC, for transmission via a network line to a remote host. Processing by the INIC of the multiple packets and multiple TCP, IP, NetBios and SMB protocol layers via custom hardware and without repeated interrupts of the host can greatly increase the speed of transmitting an SMB message to a network line.

Figure 17:
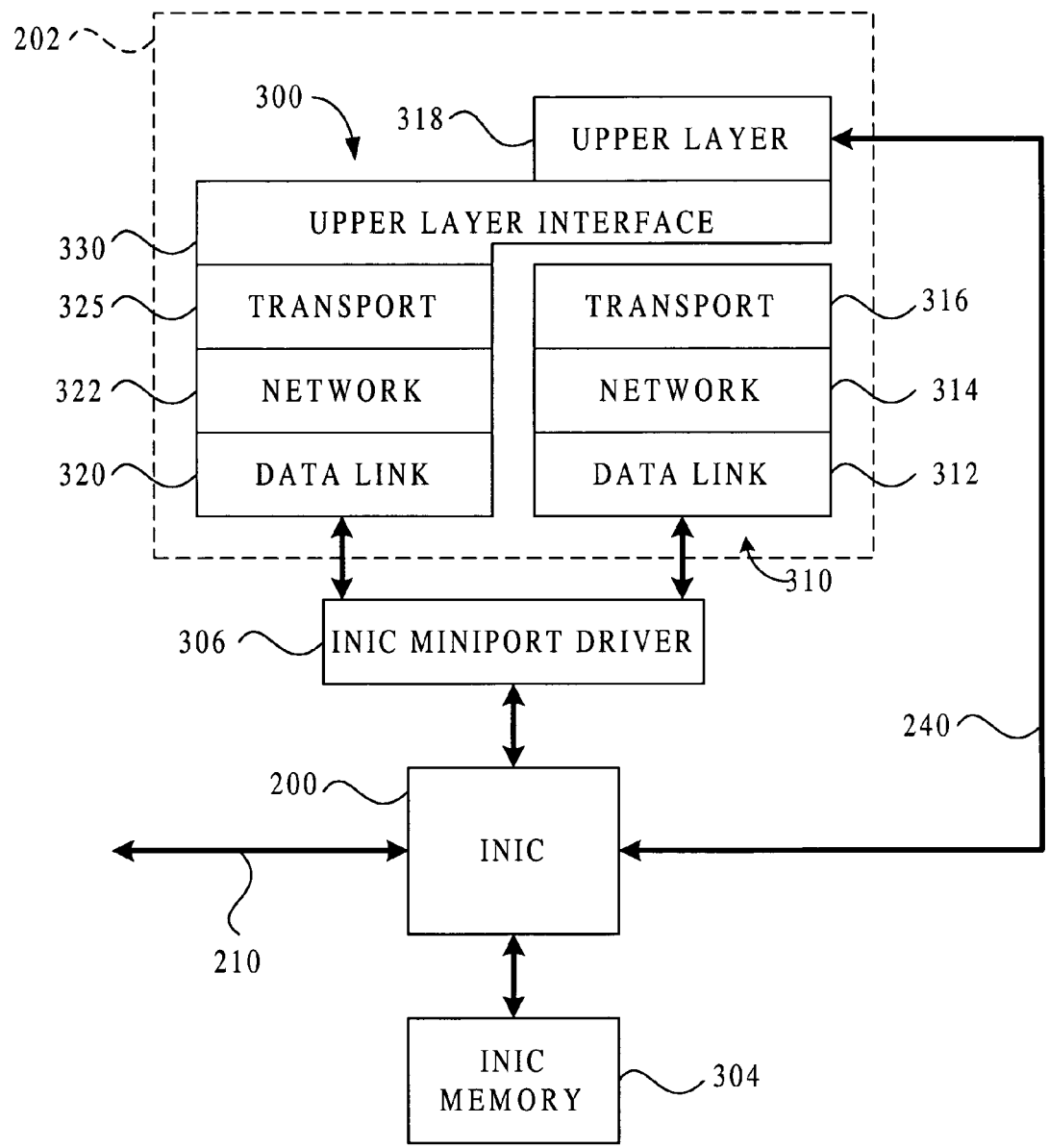
FIG. 17 is a diagram of a command driver installed in the host of FIG. 16 for creating and controlling a communication control block for the fast-path.

As shown in FIG. 17, for controlling whether a given message is processed by the host 202 or by the INIC 200, a message command driver 300 may be installed in host 202 to work in concert with a host protocol stack 310. The command driver 300 can intervene in message reception or transmittal, create CCBs and send or receive CCBs from the INIC 200, so that functioning of the INIC, aside from improved performance, is transparent to a user. Also shown is an INIC memory 304 and an INIC miniport driver 306, which can direct message packets received from network 210 to either the conventional protocol stack 310 or the command protocol stack 300, depending upon whether a packet has been labeled as a fast-path candidate. The conventional protocol stack 310 has a data link layer 312, a network layer 314 and a transport layer 316 for conventional, lower layer processing of messages that are not labeled as fast-path candidates and therefore not processed by the command stack 300. Residing above the lower layer stack 310 is an upper layer 318, which represents a session, presentation and/or application layer, depending upon the message communicated. The command driver 300 similarly has a data link layer 320, a network layer 322 and a transport layer 325.

The driver 300 includes an upper layer interface 330 that determines, for transmission of messages to the network 210, whether a message transmitted from the upper layer 318 is to be processed by the command stack 300 and subsequently the INIC fast-path, or by the conventional stack 310. When the upper layer interface 330 receives an appropriate message from the upper layer 318 that would conventionally be intended for transmission to the network after protocol processing by the protocol stack of the host, the message is passed to driver 300. The INIC then acquires network-sized portions of the message data for that transmission via INIC DMA units, prepends headers to the data portions and sends the resulting message packets down the wire. Conversely, in receiving a TCP, TTCP, SPX or similar message packet from the network 210 to be used in setting up a fast-path connection, miniport driver 306 diverts that message packet to command driver 300 for processing. The driver 300 processes the message packet to create a context for that message, with the driver 302 passing the context and command instructions back to the INIC 200 as a CCB for sending data of subsequent messages for the same connection along a fast-path. Hundreds of TCP, TTCP, SPX or similar CCB connections may be held indefinitely by the INIC, although a least recently used (LRU) algorithm is employed for the case when the INIC cache is full. The driver 300 can also create a connection context for a TTCP request which is passed to the INIC 200 as a CCB, allowing fast-path transmission of a TTCP reply to the request. A message having a protocol that is not accelerated can be processed conventionally by protocol stack 310.

Figure 18:
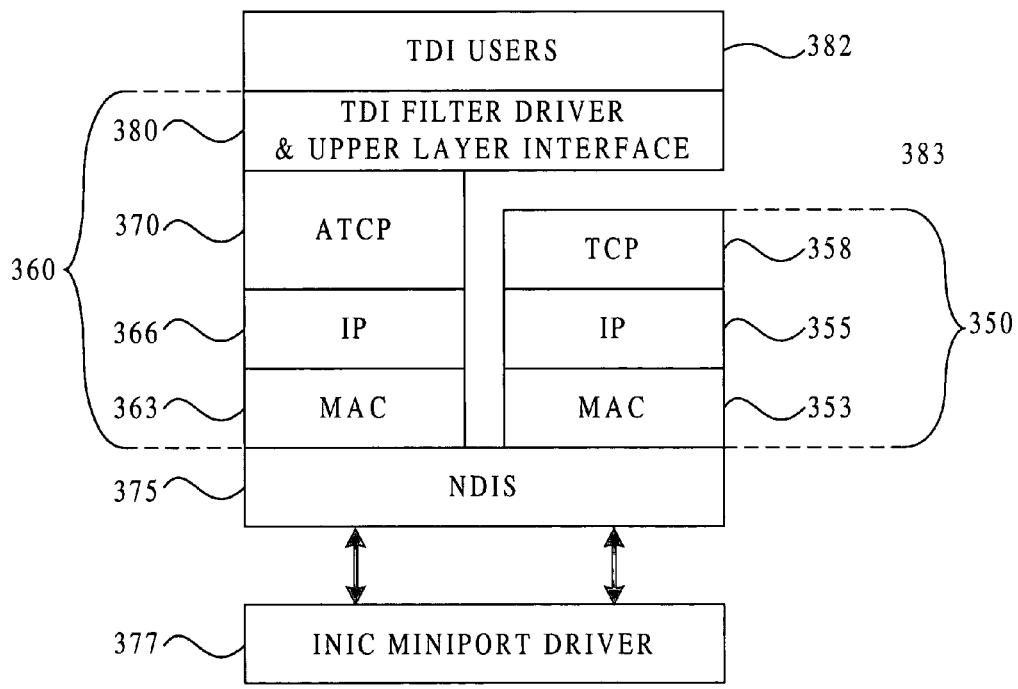
FIG. 18 is a diagram of the TCP/IP stack and command driver of FIG. 17 configured for NetBios communications.

FIG. 18 shows a TCP/IP implementation of command driver software for Microsoft® protocol messages. A conventional host protocol stack 350 includes MAC layer 353, IP layer 355 and TCP layer 358. A command driver 360 works in concert with the host stack 350 to process network messages. The command driver 360 includes a MAC layer 363, an IP layer 366 and an Alacritech TCP (ATCP) layer 373. The conventional stack 350 and command driver 360 share a network driver interface specification (NDIS) layer 375, which interacts with the INIC miniport driver 306. The INIC miniport driver 306 sorts receive indications for processing by either the conventional host stack 350 or the ATCP driver 360. A TDI filter driver and upper layer interface 380 similarly determines whether messages sent from a TDI user 382 to the network are diverted to the command driver and perhaps to the fast-path of the INIC, or processed by the host stack.

Figure 19:
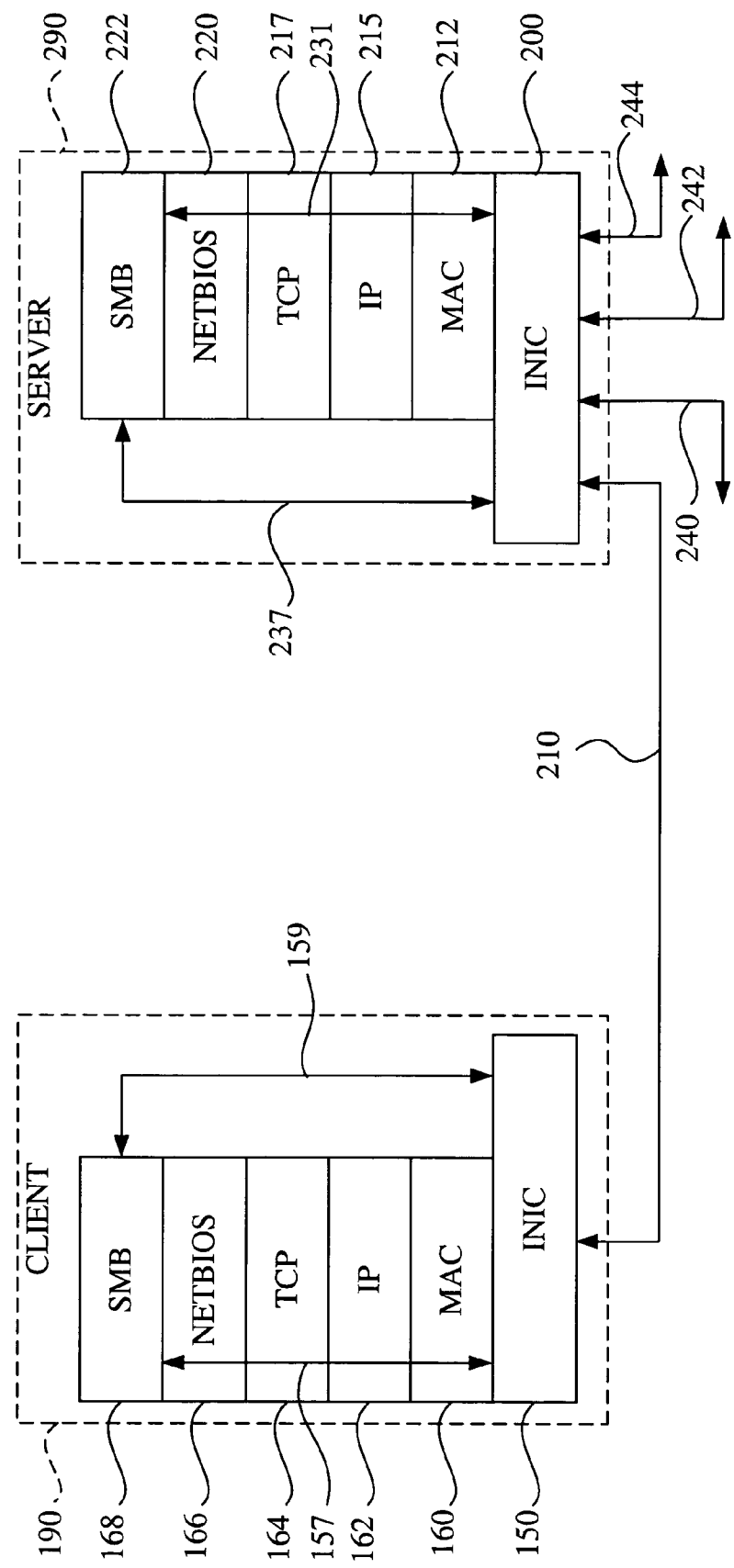
FIG. 19 is a diagram of a communication exchange between the client of FIG. 13 and the server of FIG. 16.

FIG. 19 depicts a typical SMB exchange between a client 190 and server 290, both of which have communication devices of the present invention, the communication devices each holding a CCB defining their connection for fast-path movement of data. The client 190 includes INIC 150, 802.3 compliant data link layer 160, IP layer 162, TCP layer 164, NetBios layer 166, and SMB layer 168. The client has a slow-path 157 and fast-path 159 for communication processing. Similarly, the server 290 includes INIC 200, 802.3 compliant data link layer 212, IP layer 215, TCP layer 217, NetBios layer 220, and SMB 222. The server is connected to network lines 240, 242 and 244, as well as line 210 which is connected to client 190. The server also has a slow-path 231 and fast-path 237 for communication processing.

Assuming that the client 190 wishes to read a 100 KB file on the server 290, the client may begin by sending a Read Block Raw (RBR) SMB command across network 210 requesting the first 64 KB of that file on the server 290. The RBR command may be only 76 bytes, for example, so the INIC 200 on the server will recognize the message type (SMB) and relatively small message size, and send the 76 bytes directly via the fast-path to NetBios of the server. NetBios will give the data to SMB, which processes the Read request and fetches the 64 KB of data into server data buffers. SMB then calls NetBios to send the data, and NetBios outputs the data for the client. In a conventional host, NetBios would call TCP output and pass 64 KB to TCP, which would divide the data into 1460 byte segments and output each segment via IP and eventually MAC (slow-path 231). In the present case, the 64 KB data goes to the ATCP driver along with an indication regarding the client-server SMB connection, which denotes a CCB held by the INIC. The INIC 200 then proceeds to DMA 1460 byte segments from the host buffers, add the appropriate headers for TCP, IP and MAC at one time, and send the completed packets on the network 210 (fast-path 237). The INIC 200 will repeat this until the whole 64 KB transfer has been sent. Usually after receiving acknowledgement from the client that the 64 KB has been received, the INIC will then send the remaining 36 KB also by the fast-path 237.

With INIC 150 operating on the client 190 when this reply arrives, the INIC 150 recognizes from the first frame received that this connection is receiving fast-path 159 processing (TCP/IP, NetBios, matching a CCB), and the ATCP may use this first frame to acquire buffer space for the message. This latter case is done by passing the first 128 bytes of the NetBios portion of the frame via the ATCP fast-path directly to the host NetBios; that will give NetBios/SMB all of the frame's headers. NetBios/SMB will analyze these headers, realize by matching with a request ID that this is a reply to the original RawRead connection, and give the ATCP a 64 K list of buffers into which to place the data. At this stage only one frame has arrived, although more may arrive while this processing is occurring. As soon as the client buffer list is given to the ATCP, it passes that transfer information to the INIC 150, and the INIC 150 starts DMAing any frame data that has accumulated into those buffers.

Figure 20:
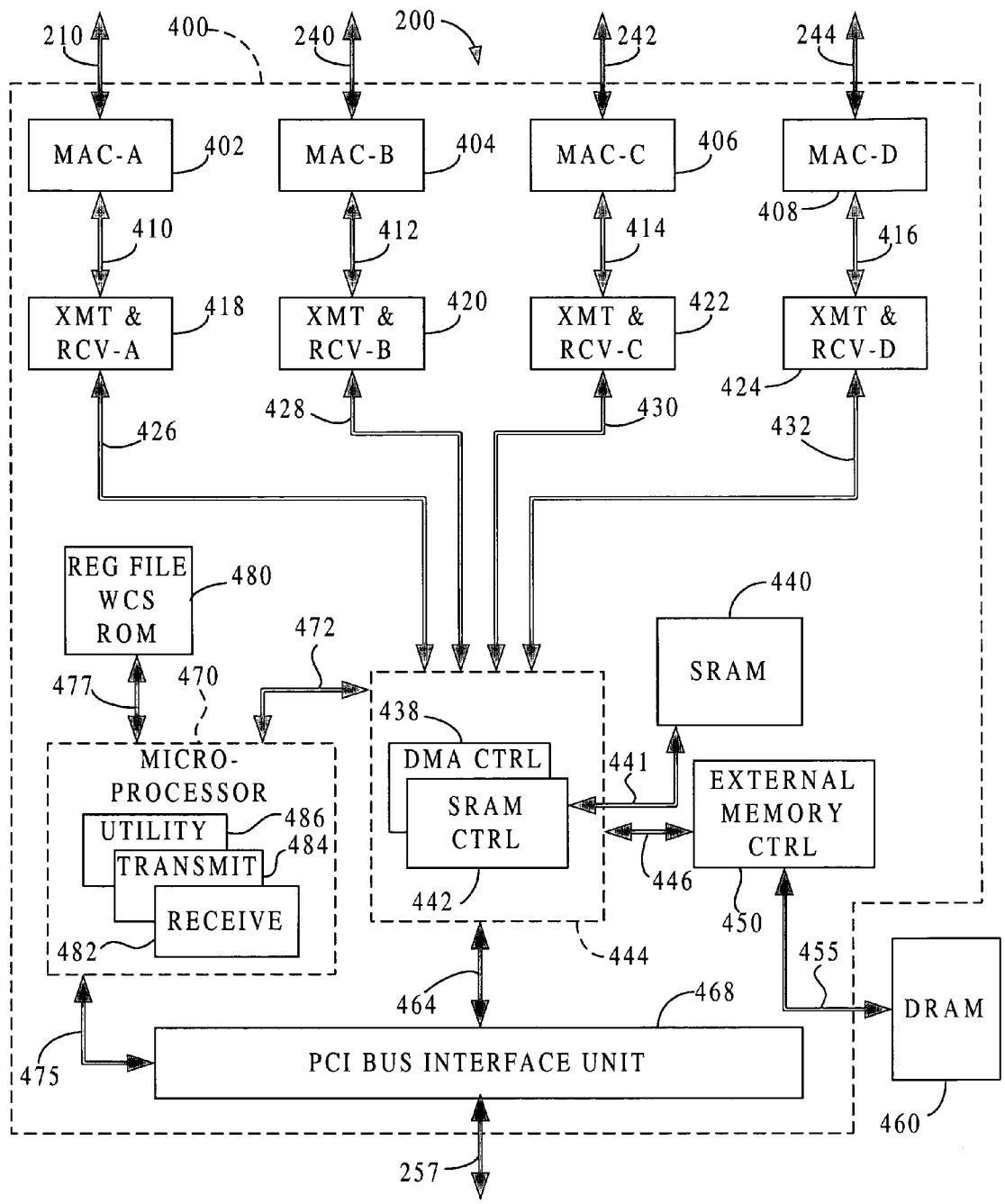
FIG. 20 is a diagram of hardware functions included in the INIC of FIG. 16.

FIG. 20 provides a simplified diagram of the INIC 200, which combines the functions of a network interface controller and a protocol processor in a single ASIC chip 400. The INIC 200 in this embodiment offers a full-duplex, four channel, 10/100-Megabit per second (Mbps) intelligent network interface controller that is designed for high speed protocol processing for server applications. Although designed specifically for server applications, the INIC 200 can be connected to personal computers, workstations, routers or other hosts anywhere that TCP/IP, TTCP/IP or SPX/IPX protocols are being utilized.

The INIC 200 is connected with four network lines 210, 240, 242 and 244, which may transport data along a number of different conduits, such as twisted pair, coaxial cable or optical fiber, each of the connections providing a media independent interface (MII). The lines preferably are 802.3 compliant and in connection with the INIC constitute four complete Ethernet nodes, the INIC supporting 10 Base-T, 10 Base-T2, 100 Base-TX, 100 Base-FX and 100 Base-T4 as well as future interface standards. Physical layer identification and initialization is accomplished through host driver initialization routines. The connection between the network lines 210, 240, 242 and 244 and the INIC 200 is controlled by MAC units MAC-A 402, MAC-B 404, MAC-C 406 and MAC-D 408 which contain logic circuits for performing the basic functions of the MAC sublayer, essentially controlling when the INIC accesses the network lines 210, 240, 242 and 244. The MAC units 402-408 may act in promiscuous, multicast or unicast modes, allowing the INIC to function as a network monitor, receive broadcast and multicast packets and implement multiple MAC addresses for each node. The MAC units 402-408 also provide statistical information that can be used for simple network management protocol (SNMP).

The MAC units 402, 404, 406 and 408 are each connected to a transmit and receive sequencer, XMT & RCV-A 418, XMT & RCV-B 420, XMT & RCV-C 422 and XMT & RCV-D 424, by wires 410, 412, 414 and 416, respectively. Each of the transmit and receive sequencers can perform several protocol processing steps on the fly as message frames pass through that sequencer. In combination with the MAC units, the transmit and receive sequencers 418-422 can compile the packet status for the data link, network, transport, session and, if appropriate, presentation and application layer protocols in hardware, greatly reducing the time for such protocol processing compared to conventional sequential software engines. The transmit and receive sequencers 410-414 are connected, by lines 426, 428, 430 and 432 to an SRAM and DMA controller 444, which includes DMA controllers 438 and SRAM controller 442. Static random access memory (SRAM) buffers 440 are coupled with SRAM controller 442 by line 441. The SRAM and DMA controllers 444 interact across line 446 with external memory control 450 to send and receive frames via external memory bus 455 to and from dynamic random access memory (DRAM) buffers 460, which is located adjacent to the IC chip 400. The DRAM buffers 460 may be configured as 4 MB, 8 MB, 16 MB or 32 MB, and may optionally be disposed on the chip. The SRAM and DMA controllers 444 are connected via line 464 to a PCI Bus Interface Unit (BIU) 468, which manages the interface between the INIC 200 and the PCI interface bus 257. The 64-bit, multiplexed BIU 380 provides a direct interface to the PCI bus 257 for both slave and master functions. The INIC 200 is capable of operating in either a 64-bit or 32-bit PCI environment, while supporting 64-bit addressing in either configuration.

A microprocessor 470 is connected by line 472 to the SRAM and DMA controllers 444, and connected via line 475 to the PCI BIU 468. Microprocessor 470 instructions and register files reside in an on chip control store 480, which includes a writable on-chip control store (WCS) of SRAM and a read only memory (ROM), and is connected to the microprocessor by line 477. The microprocessor 470 offers a programmable state machine which is capable of processing incoming frames, processing host commands, directing network traffic and directing PCI bus traffic. Three processors are implemented using shared hardware in a three level pipelined architecture that launches and completes a single instruction for every clock cycle. A receive processor 482 is dedicated to receiving communications while a transmit processor 484 is dedicated to transmitting communications in order to facilitate full duplex communication, while a utility processor 486 offers various functions including overseeing and controlling PCI register access. The instructions for the three processors 482, 484 and 486 reside in the on-chip control-store 480.

The INIC 200 in this embodiment can support up to 256 CCBs which are maintained in a table in the DRAM 460. There is also, however, a CCB index in hash order in the SRAM 440 to save sequential searching. Once a hash has been generated, the CCB is cached in SRAM, with up to sixteen cached CCBs in SRAM in this example. These cache locations are shared between the transmit 484 and receive 486 processors so that the processor with the heavier load is able to use more cache buffers. There are also eight header buffers and eight command buffers to be shared between the sequencers. A given header or command buffer is not statically linked to a specific CCB buffer, as the link is dynamic on a per-frame basis.

Figure 21:
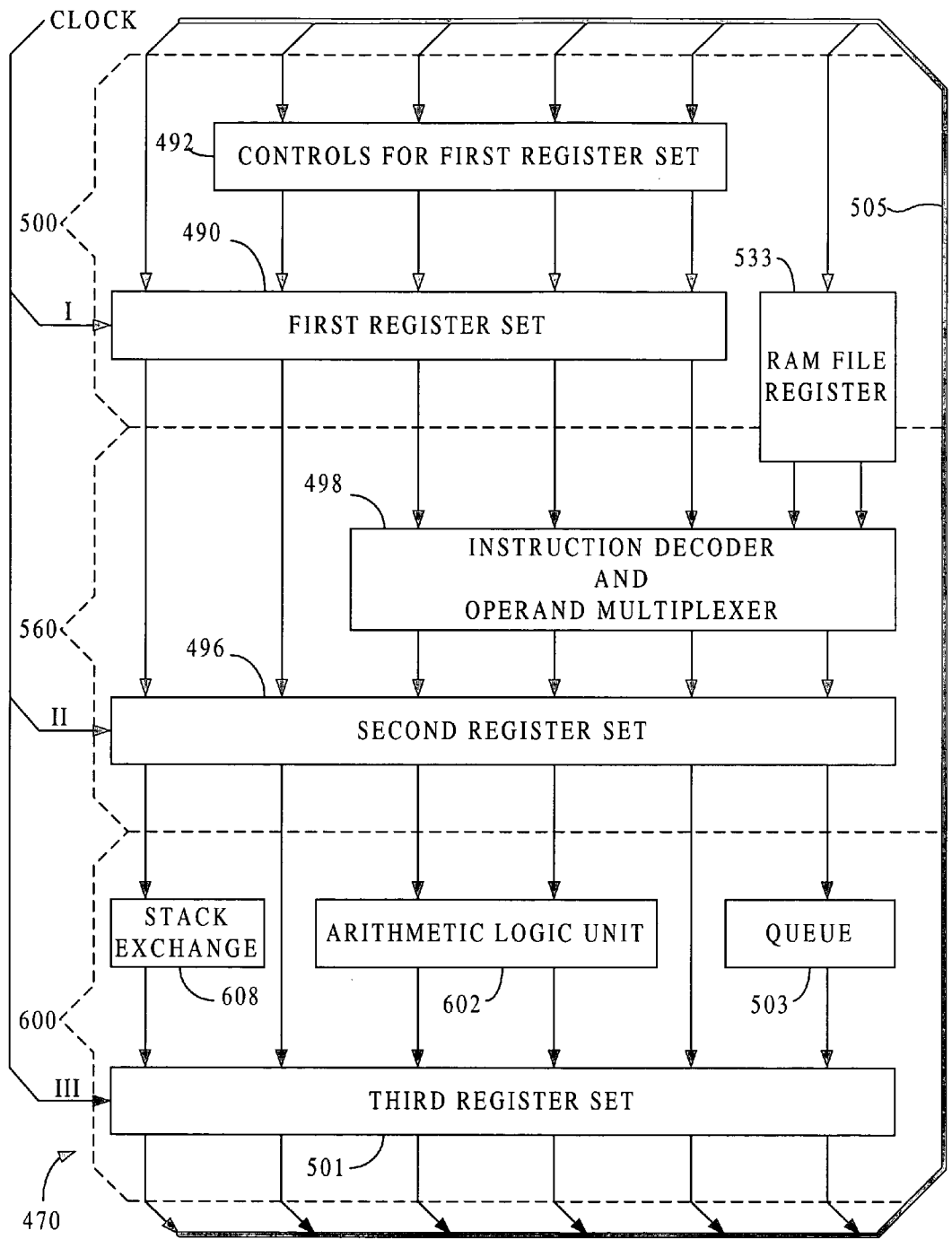
FIG. 21 is a diagram of a trio of pipelined microprocessors included in the INIC of FIG. 20, including three phases with a processor in each phase.

FIG. 21 shows an overview of the pipelined microprocessor 470, in which instructions for the receive, transmit and utility processors are executed in three distinct phases according to Clock increments I, II and III, the phases corresponding to each of the pipeline stages. Each phase is responsible for different functions, and each of the three processors occupies a different phase during each Clock increment. Each processor usually operates upon a different instruction stream from the control store 480, and each carries its own program counter and status through each of the phases.

In general, a first instruction phase 500 of the pipelined microprocessors completes an instruction and stores the result in a destination operand, fetches the next instruction, and stores that next instruction in an instruction register. A first register set 490 provides a number of registers including the instruction register, and a set of controls 492 for first register set provides the controls for storage to the first register set 490. Some items pass through the first phase without modification by the controls 492, and instead are simply copied into the first register set 490 or a RAM file register 533. A second instruction phase 560 has an instruction decoder and operand multiplexer 498 that generally decodes the instruction that was stored in the instruction register of the first register set 490 and gathers any operands which have been generated, which are then stored in a decode register of a second register set 496. The first register set 490, second register set 496 and a third register set 501, which is employed in a third instruction phase 600, include many of the same registers, as will be seen in the more detailed views of FIGS. 14A-C. The instruction decoder and operand multiplexer 498 can read from two address and data ports of the RAM file register 533, which operates in both the first phase 500 and second phase 560. A third phase 600 of the processor 470 has an arithmetic logic unit (ALU) 602 which generally performs any ALU operations on the operands from the second register set, storing the results in a results register included in the third register set 501. A stack exchange 608 can reorder register stacks, and a queue manager 503 can arrange queues for the processor 470, the results of which are stored in the third register set.

The instructions continue with the first phase then following the third phase, as depicted by a circular pipeline 505. Note that various functions have been distributed across the three phases of the instruction execution in order to minimize the combinatorial delays within any given phase. With a frequency in this embodiment of 66 Megahertz, each Clock increment takes 15 nanoseconds to complete, for a total of 45 nanoseconds to complete one instruction for each of the three processors. The instruction phases are depicted in more detail in FIGS. 15A-C, in which each phase is shown in a different figure.

Figure 22A:
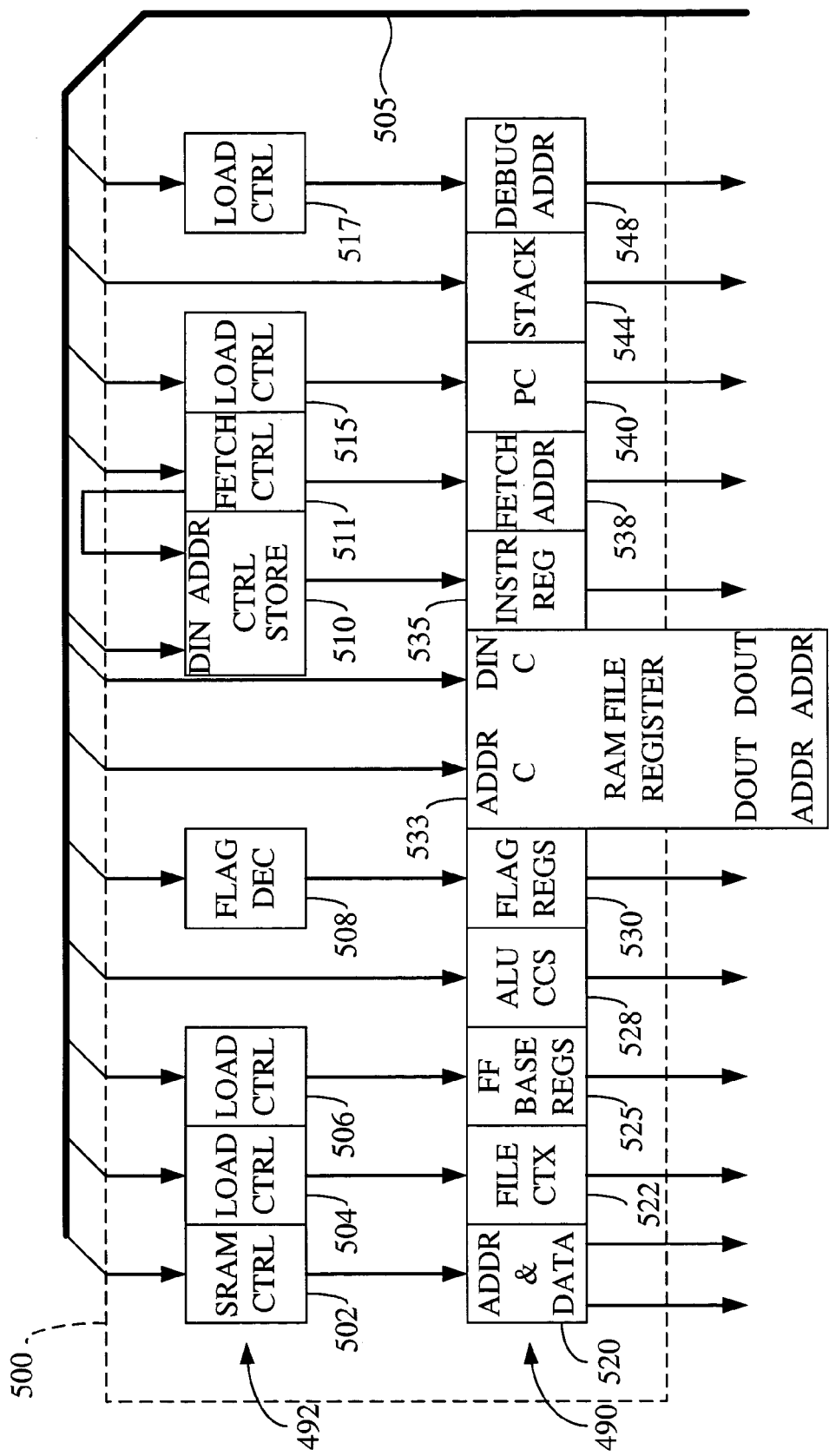
FIG. 22A is a diagram of a first phase of the pipelined microprocessor of FIG. 21.

More particularly, FIG. 22A shows some specific hardware functions of the first phase 500, which generally includes the first register set 490 and related controls 492. The controls for the first register set 492 includes an SRAM control 502, which is a logical control for loading address and write data into SRAM address and data registers 520. Thus the output of the ALU 602 from the third phase 600 may be placed by SRAM control 502 into an address register or data register of SRAM address and data registers 520. A load control 504 similarly provides controls for writing a context for a file to file context register 522, and another load control 506 provides controls for storing a variety of miscellaneous data to flip-flop registers 525. ALU condition codes, such as whether a carried bit is set, get clocked into ALU condition codes register 528 without an operation performed in the first phase 500. Flag decodes 508 can perform various functions, such as setting locks, that get stored in flag registers 530.

The RAM file register 533 has a single write port for addresses and data and two read ports for addresses and data, so that more than one register can be read from at one time. As noted above, the RAM file register 533 essentially straddles the first and second phases, as it is written in the first phase 500 and read from in the second phase 560. A control store instruction 510 allows the reprogramming of the processors due to new data in from the control store 480, not shown in this figure, the instructions stored in an instruction register 535. The address for this is generated in a fetch control register 511, which determines which address to fetch, the address stored in fetch address register 538. Load control 515 provides instructions for a program counter 540, which operates much like the fetch address for the control store. A last-in first-out stack 544 of three registers is copied to the first register set without undergoing other operations in this phase. Finally, a load control 517 for a debug address 548 is optionally included, which allows correction of errors that may occur.

Figure 22B:
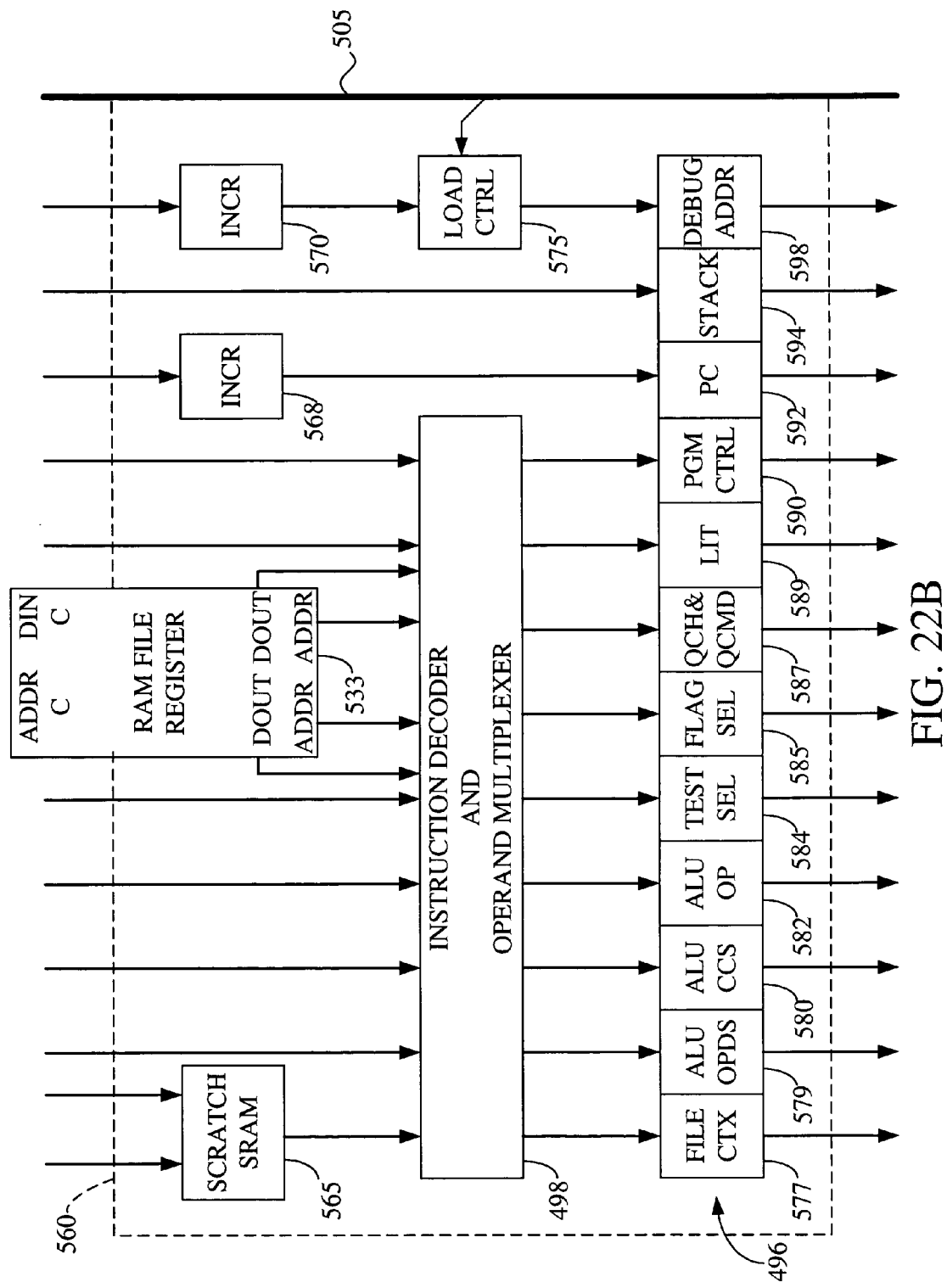
FIG. 22B is a diagram of a second phase of the pipelined microprocessor of FIG. 21.

FIG. 22B depicts the second microprocessor phase 560, which includes reading addresses and data out of the RAM file register 533. A scratch SRAM 565 is written from SRAM address and data register 520 of the first register set, which includes a register that passes through the first two phases to be incremented in the third. The scratch SRAM 565 is read by the instruction decoder and operand multiplexer 498, as are most of the registers from the first register set, with the exception of the stack 544, debug address 548 and SRAM address and data register mentioned above. The instruction decoder and operand multiplexer 498 looks at the various registers of set 490 and SRAM 565, decodes the instructions and gathers the operands for operation in the next phase, in particular determining the operands to provide to the ALU 602 below. The outcome of the instruction decoder and operand multiplexer 498 is stored to a number of registers in the second register set 496, including ALU operands 579 and 582, ALU condition code register 580, and a queue channel and command 587 register, which in this embodiment can control thirty-two queues. Several of the registers in set 496 are loaded fairly directly from the instruction register 535 above without substantial decoding by the decoder 498, including a program control 590, a literal field 589, a test select 584 and a flag select 585. Other registers such as the file context 522 of the first phase 500 are always stored in a file context 577 of the second phase 560, but may also be treated as an operand that is gathered by the multiplexer 572. The stack registers 544 are simply copied in stack register 594. The program counter 540 is incremented 568 in this phase and stored in register 592. Also incremented 570 is the optional debug address 548, and a load control 575 may be fed from the pipeline 505 at this point in order to allow error control in each phase, the result stored in debug address 598.

Figure 22C:
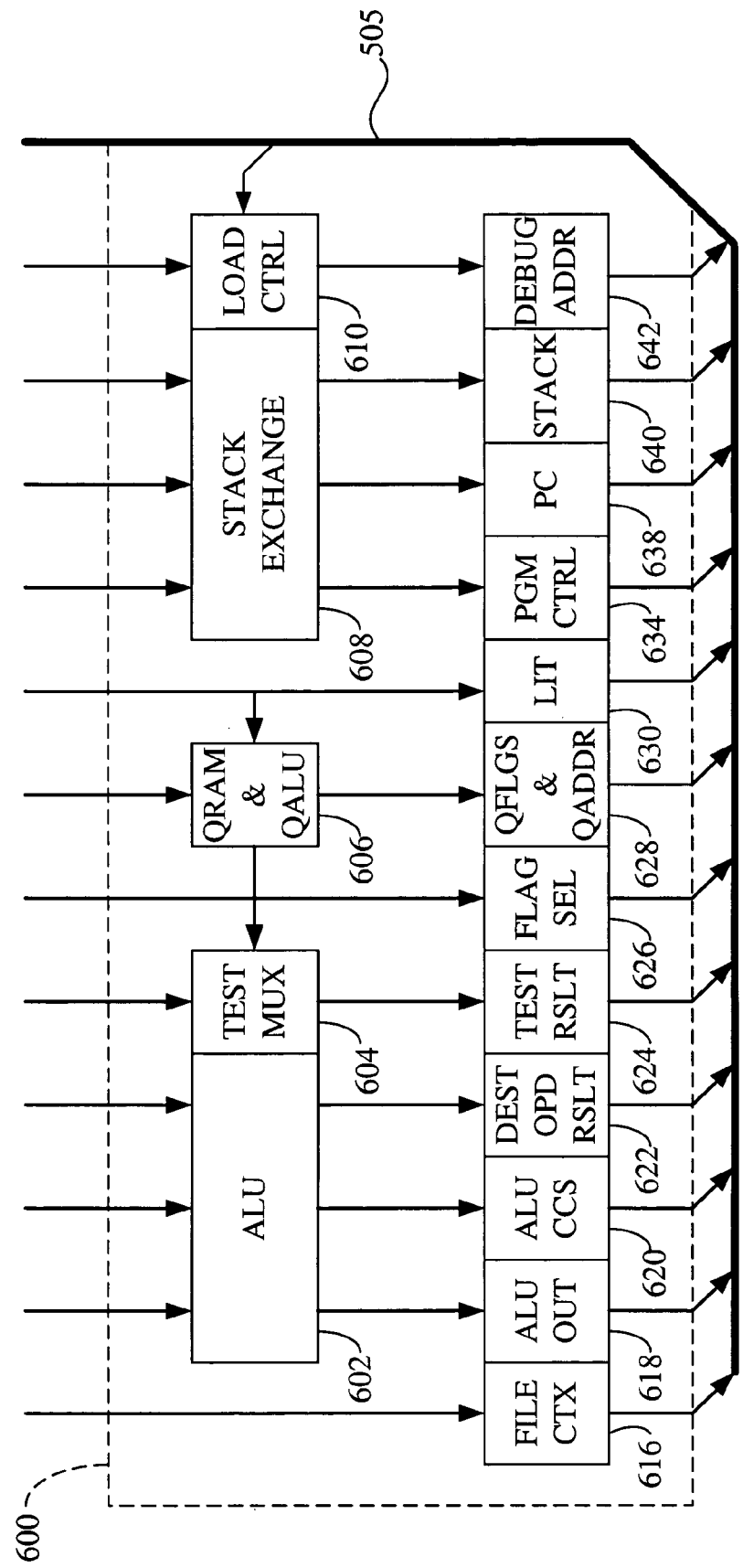
FIG. 22C is a diagram of a third phase of the pipelined microprocessor of FIG. 21.

FIG. 22C depicts the third microprocessor phase 600, which includes ALU and queue operations. The ALU 602 includes an adder, priority encoders and other standard logic functions. Results of the ALU are stored in registers ALU output 618, ALU condition codes 620 and destination operand results 622. A file context register 616, flag select register 626 and literal field register 630 are simply copied from the previous phase 560. A test multiplexer 604 is provided to determine whether a conditional jump results in a jump, with the results stored in a test results register 624. The test multiplexer 604 may instead be performed in the first phase 500 along with similar decisions such as fetch control 511. A stack exchange 608 shifts a stack up or down depending by fetching a program counter from stack 594 or putting a program counter onto that stack, results of which are stored in program control 634, program counter 638 and stack 640 registers. The SRAM address may optionally be incremented in this phase 600. Another load control 610 for another debug address 642 may be forced from the pipeline 505 at this point in order to allow error control in this phase also. A queue RAM and queue ALU 606 reads from the queue channel and command register 587, stores in SRAM and rearranges queues, adding or removing data and pointers as needed to manage the queues of data, sending results to the test multiplexer 604 and a queue flags and queue address register 628. Thus the queue RAM and ALU 606 assumes the duties of managing queues for the three processors, a task conventionally performed sequentially by software on a CPU, the queue manager 606 instead providing accelerated and substantially parallel hardware queuing.

The above-described system for protocol processing of data communication results in dramatic reductions in the time required for processing large, connection-based messages. Protocol processing speed is tremendously accelerated by specially designed protocol processing hardware as compared with a general purpose CPU running conventional protocol software, and interrupts to the host CPU are also substantially reduced. These advantages can be provided to an existing host by addition of an intelligent network interface card (INIC), or the protocol processing hardware may be integrated with the CPU. In either case, the protocol processing hardware and CPU intelligently decide which device processes a given message, and can change the allocation of that processing based upon conditions of the message.

The invention claimed is:

1. A system for communication between by a local host that is connectable by a network to a remote host, the system comprising:
   a communication processing device (CPD) that is integrated into the local host to connect the network and the local host, said CPD including hardware configured to analyze Internet Protocol (IP) and Transmission Control Protocol (TCP) headers of network packets, and
   a central processing unit (CPU) running protocol processing instructions in the local host to create a TCP connection between the local host and the remote host, said CPU providing to said CPD a media-access control (MAC) address, an IP address and a TCP port that correspond to said connection, wherein said CPD and said CPU are configured such that a message transferred between the network and the local host is generally processed by said CPD instead of said CPU when said CPD controls said connection and said message corresponds to said connection.

2. The system of claim 1, wherein said CPU provides to said CPD an address in local host memory for storing application data from said message.

3. The system of claim 1, wherein said CPU provides to said CPD an address in local host memory for retrieving application data corresponding to said connection.

4. The system of claim 1, wherein said CPD is connected to said CPU by a bus.

5. The system of claim 1, wherein said CPD includes a microprocessor.

6. The system of claim 1, wherein said CPD is connected to an input/output (I/O) controller.

7. The system of claim 6, wherein said I/O controller is a peripheral component interconnect (PCI) bridge.

8. The system of claim 1, further comprising a memory that is disposed in said host and accessible by said CPU and said CPD.

9. The system of claim 1, wherein said CPD is integrated with a peripheral component interconnect (PCI) bridge.

10. The system of claim 1, wherein said CPD is integrated with a memory controller for said CPU.

11. The system of claim 1, wherein said CPD is integrated with an I/O controller and a memory controller for said CPU.

12. The system of claim 1, wherein said CPD is connected with an I/O controller that connects said CPD to a memory controller for said CPU.

13. The system of claim 1, wherein said CPD is connected to a hub interface bus that connects a memory controller to an I/O controller.

14. The system of claim 1, wherein said message is received from the network by the local host.

15. A system for communication by a local host that is connectable by a network to a remote host, the system comprising:
   a communication processing device (CPD) that is integrated into the local host to connect the network and the local host, said CPD including hardware configured to analyze Internet Protocol (IP) and Transmission Control Protocol (TCP) headers of network packets, and
   a central processing unit (CPU) running protocol processing instructions in the local host to create a TCP connection between the local host and the remote host, said CPU providing to said CPD a media-access control (MAC) address, an IP address and a TCP port that correspond to said connection, wherein said CPD and said CPU are configured such that a packet transferred between the network and the local host is processed by said CPD and not by said CPU when said CPD controls said connection and said packet corresponds to said connection.

16. The system of claim 15, wherein said CPD is connected to said CPU by a bus.

17. The system of claim 15, wherein said CPD includes a microprocessor.

18. The system of claim 15, wherein said CPD is connected to an input/output (I/O) controller.

19. The system of claim 15, wherein said CPD is connected to a peripheral component interconnect (PCI) bridge.

20. The system of claim 15, further comprising a memory that is disposed in said host and accessible by said CPU and said CPD.

21. The system of claim 15, wherein said CPD is integrated with a peripheral component interconnect (PCI) bridge.

22. The system of claim 15, wherein said CPD is integrated with a memory controller for said CPU.

23. The system of claim 15, wherein said CPD is integrated with an I/O controller and a memory controller for said CPU.

24. The system of claim 15, wherein said CPD is connected with an I/O controller that connects said CPD to a memory controller for said CPU.

25. The system of claim 15, wherein said CPD is connected to a hub interface bus that connects a memory controller to an I/O controller.

26. The system of claim 15, further comprising an ownership bit disposed in the local host, said ownership bit designating whether said CPU or said CPD controls said connection.

27. The system of claim 15, wherein said packet is received from the network by the local host.

28. A system for communication by a local host that is connectable by a network to a remote host, the system comprising:
   a central processing unit (CPU) disposed in the local host and running protocol processing instructions to create a Transmission Control Protocol (TCP) connection between the local host and the remote host, said CPU processing a first network packet corresponding to said connection; and
   a communication processing device (CPD) integrated into the local host and connected to the network, said CPU providing to said CPD a media-access control (MAC) address, an Internet Protocol (IP) address and a Transmission Control Protocol (TCP) port that correspond to said connection, said CPD receiving control of said connection from said CPU, said CPD classifying a second network packet as corresponding to said connection and processing said second network packet without any protocol processing of said second network packet by said CPU.

29. The system of claim 28, wherein said CPD is connected to said CPU by a bus.

30. The system of claim 28, wherein said CPD includes a microprocessor.

31. The system of claim 28, wherein said CPD is connected to an input/output (I/O) controller.

32. The system of claim 28, wherein said CPD is connected to a peripheral component interconnect (PCI) bridge.

33. The system of claim 28, further comprising a memory that is accessible by said CPU and said CPD.

34. The system of claim 28, wherein said CPD is integrated with a peripheral component interconnect (PCI) bridge.

35. The system of claim 28, wherein said CPD is integrated with a memory controller for said CPU.

36. The system of claim 28, wherein said CPD is integrated with an I/O controller and a memory controller for said CPU.

37. The system of claim 28, wherein said CPD is connected with an I/O controller that connects said CPD to a memory controller for said CPU.

38. The system of claim 28, wherein said CPD is connected to a hub interface bus that connects a memory controller to an I/O controller.

39. The system of claim 28, further comprising an ownership bit disposed in the local host, said ownership bit designating whether said CPU or said CPD controls said connection.

40. The system of claim 28, wherein said second network packet is received from the network by the local host.

* * * * *

UNITED STATES PATENT AND TRADEMARK OFFICE
CERTIFICATE OF CORRECTION

| | | |
|---|---|---|
| PATENT NO. | : 7,502,869 B2 | Page 1 of 1 |
| APPLICATION NO. | : 10/724588 | |
| DATED | : March 10, 2009 | |
| INVENTOR(S) | : Laurence B. Boucher | |

It is certified that error appears in the above-identified patent and that said Letters Patent is hereby corrected as shown below:

In column 23, line 17, delete "between".

Signed and Sealed this

Twenty-eighth Day of April, 2009

JOHN DOLL
*Acting Director of the United States Patent and Trademark Office*